US008014018B2

(12) United States Patent
Kayanaka

(10) Patent No.: US 8,014,018 B2
(45) Date of Patent: Sep. 6, 2011

(54) PRINTING APPARATUS

(75) Inventor: Yoshihisa Kayanaka, Ama-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 28 days.

(21) Appl. No.: 12/453,823

(22) Filed: May 22, 2009

(65) Prior Publication Data

US 2009/0289990 A1 Nov. 26, 2009

(30) Foreign Application Priority Data

May 26, 2008 (JP) ................................ 2008-136261

(51) Int. Cl.
*G06K 1/00* (2006.01)

(52) U.S. Cl. ...................................................... 358/1.15

(58) Field of Classification Search ........................ None
See application file for complete search history.

(56) References Cited

U.S. PATENT DOCUMENTS

| | | | | |
|---|---|---|---|---|
| 6,116,728 | A | 9/2000 | Miyake et al. | |
| 7,086,716 | B2 * | 8/2006 | Steinfield et al. | 347/32 |
| 2005/0179708 | A1 * | 8/2005 | Ben-Zur | 347/2 |

FOREIGN PATENT DOCUMENTS

| | | | |
|---|---|---|---|
| EP | 0 558 236 | A2 | 9/1993 |
| EP | 0 796 740 | B1 | 11/2002 |
| JP | B2-3029516 | | 4/2000 |

* cited by examiner

*Primary Examiner* — Matthew Luu
*Assistant Examiner* — Alejandro Valencia
(74) *Attorney, Agent, or Firm* — Oliff & Berridge, PLC

(57) ABSTRACT

A printing apparatus is provided. The printing apparatus includes at least two print heads, at least two print head drive units, and a cooperation controlling system to control printing operations in the printing apparatus. When a first printing operation and a second printing operation are conducted successively, the cooperation controlling system controls at least one of a second print head and the second print head drive unit so that a second pre-print operation is conducted at least partially simultaneously with the first printing operation and a first after-print operation is conducted at least partially simultaneously with the second printing operation, and the first print head and the first print head drive unit so that a first pre-print operation is conducted at least partially simultaneously with the second printing operation and a second after-print operation is conducted at least partially simultaneously with the first printing operation.

10 Claims, 16 Drawing Sheets

PRINTING APPARATUS

CROSS REFERENCE TO RELATED APPLICATION

This application claims priority from Japanese Patent Application No. 2008-136261, filed on May 26, 2008, the entire subject matter of which is incorporated herein by reference.

BACKGROUND

1. Technical Field

An aspect of the present invention relates to a printing apparatus, more specifically, a printing apparatus to print images on fabrics.

2. Related Art

Conventionally, a printing apparatus for printing an image on a piece of fabric, having a platen to hold the fabric, an inkjet head to eject inks onto the fabric, a carriage to move the inkjet head, an operation panel, and a set of colored inks, has been known. According to such a printing apparatus, an image represented by a piece of print data is formed on a piece of fabric as the carriage is moved in a main scanning direction and the platen is moved in an auxiliary direction.

Such a printing apparatus is disclosed in, for example, Japanese Patent Publication No. 3029516. According to the publication, the printing apparatus is provided with two carriages, which are a first carriage arranged on an upstream side in direction to move the fabric (i.e., the auxiliary direction) and a second carriage arranged on a downstream side in the platen's moving direction. The first carriage and the second carriage are provided with a first print head and a second print head respectively so that images are formed the fabric being moved in the auxiliary direction successively, i.e., firstly with the first print head and secondly with the second print head.

Generally, prior to and after a printing operation, an inkjet printing apparatus conducts a pre-printing operation and an after-printing operation. That is, when the inkjet printing apparatus completes a printing operation, the carriage with the inkjet heads is moved to a maintenance position, and a nozzle surface of the inkjet head is wiped and capped (after-print operation), in order to prevent the nozzle surface from being dried out. When the inkjet printing apparatus starts a printing operation, the cap covering the nozzle surface of the inkjet head is detached, the uncovered nozzle surface is wiped, and the carriage is moved to a print-start position, in which the inkjet head starts ejecting inks (pre-print operation).

SUMMARY

In the printing apparatus disclosed in the above publication, it is assumed that when a printing operation is conducted for each of the pieces fabrics held on the platens successively, although not specifically described, the after-printing operation is conducted after a first printing operation to a first piece of fabric, and the pre-printing operation is conducted immediately thereafter and prior to a second printing operation to a second piece of fabric. In other words, the nozzle surface of the inkjet head is wiped and capped in the after-printing operation, and uncapped in the pre-printing operation. The after-printing operation and the pre-printing operation successively conducted between the first printing operation and the second printing operation can be redundant and may unnecessarily take time between the two printing operations.

Accordingly, non-operative time for the inkjet heads is increased, and productivity of the printing apparatus per unit of time is decreased.

In view of the above, the present invention is advantageous in that a printing apparatus with less non-operative time for the inkjet heads and with higher productivity per unit of time is provided.

According to an aspect of the invention, a printing apparatus capable of forming images successively on a plurality of pieces of recording media is provided. The printing apparatus includes at least two medium holders including a first medium holder to hold a first recording medium and a second medium holder to hold a second recording medium, at least two print heads including a first print head, which is driven according to first print data to eject ink onto the first recording medium and the second recording medium, and a second print head, which is driven according to second print data to eject ink onto the first recording medium and the second recording medium, at least two print head drive units including a first print head drive unit, which drives the first print head in a main scanning direction, and a second print head drive unit, which drives the second print head in the main scanning direction, at least two holder drive units including a first holder drive unit to drive the first medium holder in an auxiliary direction, which is perpendicular to the main scanning direction, and a second holder drive unit to drive the second medium holder in the auxiliary direction, at least two ink cartridges including a first ink cartridge, which stores ink therein and supplies the ink to the first print head, and a second ink cartridge, which stores ink therein and supplies the ink to the second print head, and a cooperation controlling system to control printing operations in the printing apparatus. The printing operations include a first printing operation to print an image on one of the first recording medium and the second recording medium in cooperation with the first print head, the first print head drive unit, and one of the first holder drive unit and the second holder drive unit, a first pre-print operation including a moving behavior, by which the first print head is moved from a first maintenance position to a first starting position, a first after-print operation including a moving behavior, by which the first print head is moved from a first ending position to the first maintenance position, a second printing operation to print an image on one of the first recording medium and the second recording medium in cooperation with the second print head, the second print head drive unit, and one of the first holder drive unit and the second holder drive unit, a second pre-print operation including a moving behavior, by which the second print head is moved from a second maintenance position to a second starting position, and a second after-print operation including a moving behavior, by which the second print head is moved from a second ending position to the second maintenance position. The cooperation controlling system controls at least one of the second print head and the second print head drive unit so that the second pre-print operation is conducted at least partially simultaneously with the first printing operation and the first after-print operation is conducted at least partially simultaneously with the second printing operation when the first printing operation and the second printing operation are conducted successively to one of the first recording medium and the second recording medium, and the first print head and the first print head drive unit so that the first pre-print operation is conducted at least partially simultaneously with the second printing operation and the second after-print operation is conducted at least partially simultaneously with the first printing operation when the first printing operation and the second printing operation are conducted successively to one of the first recording medium and the second recording medium.

With the printing apparatus according to the above configuration, the second pre-print operation is not restrained until completion of the first after-print operation. Rather, the first after-print operation and the second pre-print operation are at least partially overlapped with the first or the second printing operation. Additionally or alternatively, the first pre-print operation is not restrained until completion of the second after-print operation. Rather, the second after-print operation and the first pre-print operation are at least partially overlapped with the first or the second printing operation. Therefore, non-printing period, in which no first or second printing operation is performed, is effectively shortened, and productivity of the printing apparatus per unit of time can be increased.

BRIEF DESCRIPTION OF THE ACCOMPANYING DRAWINGS

DETAILED DESCRIPTION

Hereinafter, an embodiment according to an aspect of the present invention will be described with reference to the accompanying drawings.

Figure 1:
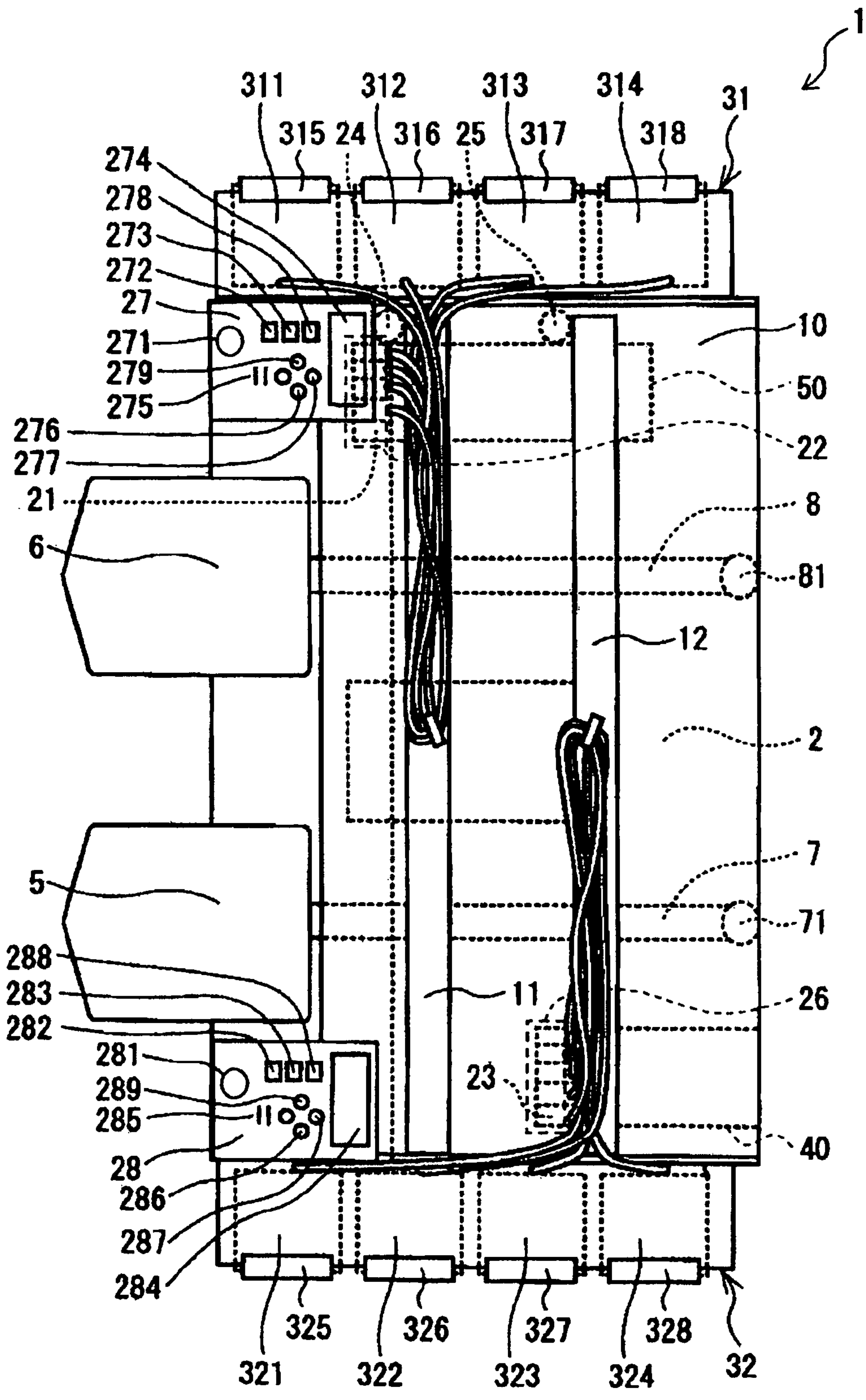
FIG. 1 is a top plane view of an inkjet printer according to an embodiment of the present invention.
Figure 2:
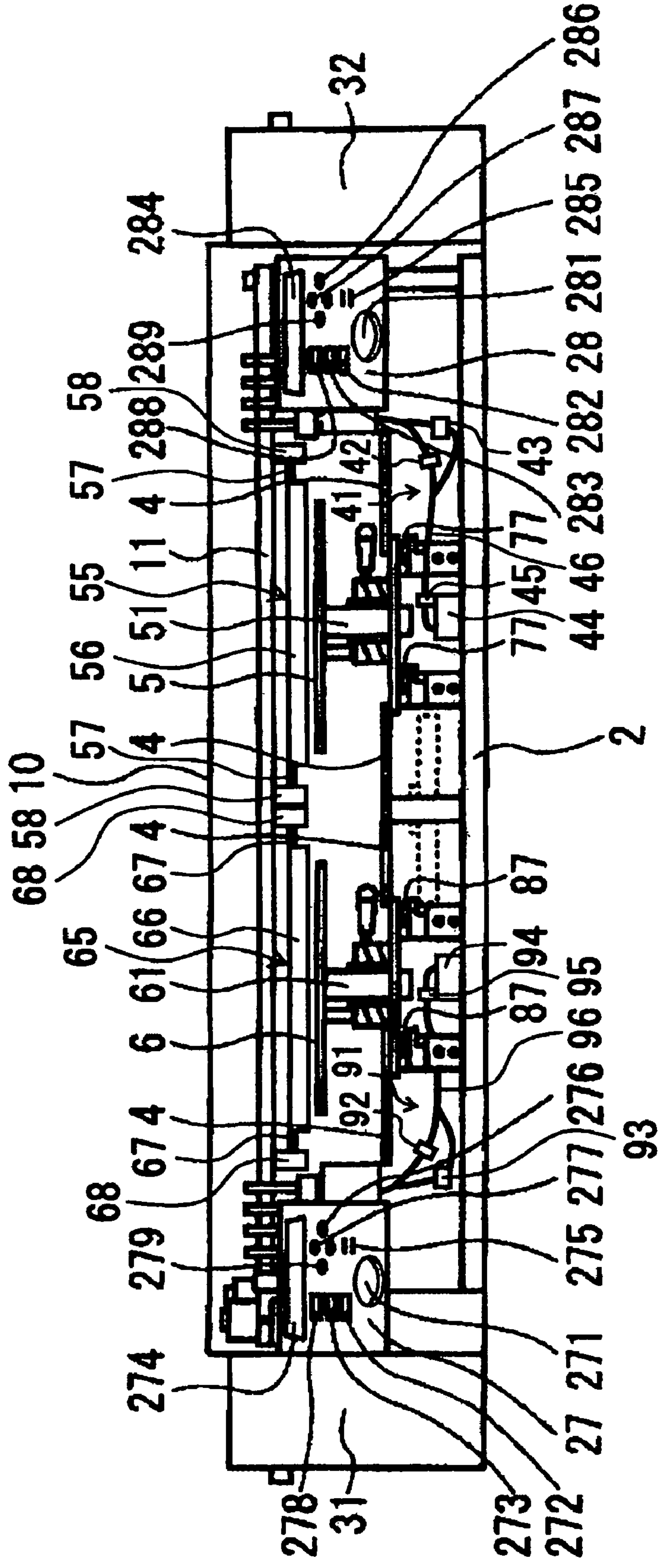
FIG. 2 is a front view of the inkjet printer according to the embodiment of the present invention.

An inkjet printer 1 according to the embodiment of the present invention will be described with reference to FIGS. 1 and 2. FIG. 1 is a top plane view of the inkjet printer 1 according to the embodiment of the present invention. FIG. 2 is a front view of the inkjet printer 1 according to the embodiment of the present invention.

The inkjet printer 1 according to the present embodiment is an inkjet printer having a first print head 23 to eject white (W) ink onto a recording medium and a second print head 21, from which inks in colors of cyan (C), magenta (M), yellow (Y), and black (K) are ejected onto the recording medium. The recording medium in the present embodiment is a piece of fabric, for example a T-shirt, and an image according to image data inputted in the inkjet printer 1 from an external data processing apparatus is formed on the T-shirt. As shown in FIGS. 1 and 2, the inkjet printer 1 is provided with a flat base 2 at a bottom thereof and a casing 10 to cover an entire configuration of the inkjet printer 1.

In the present embodiment, a left-hand side which appears in FIG. 1 is referred to as the front side of the inkjet printer 1. Further, an upper side in FIG. 1 and a left-hand side in FIG. 2 correspond to the left end of the inkjet printer 1. Accordingly, a lower side in FIG. 1 and a right-hand side in FIG. 2 correspond to the right end of the inkjet printer 1. In addition, a direction, in which a first carriage 26 with the first print head 23 mounted thereon and a second carriage 22 with the second print heads 21 mounted thereon are reciprocated, corresponds to a main scanning direction (i.e., a vertical direction in FIG. 1) of the print heads 21, 23.

Inside the casing 10, the inkjet printer 1 is provided with an inkjet printing mechanism, which includes the first print head 23, the first carriage 26, and a guide rail 12. The guide rail 12 is arranged in parallel with the main scanning direction to guide the first carriage 26 with the first print head 23 therealong. Further, a first carriage motor 25, a pulley (not shown), and a carriage belt (not shown) are provided. The first carriage motor 25 is in vicinity to one end (an upper end in FIG. 1 in the present embodiment) of the guide rail 12, and the pulley is in vicinity to the other end (a lower end in FIG. 1). The carriage belt is provided to connect the first carriage motor 25 and the pulley. The carriage belt is fixed to a rear side of the first carriage 26 so that the first carriage 26 can be reciprocated along the guide rail 12 as the carriage belt is driven by the first carriage motor 25.

Figure 3:
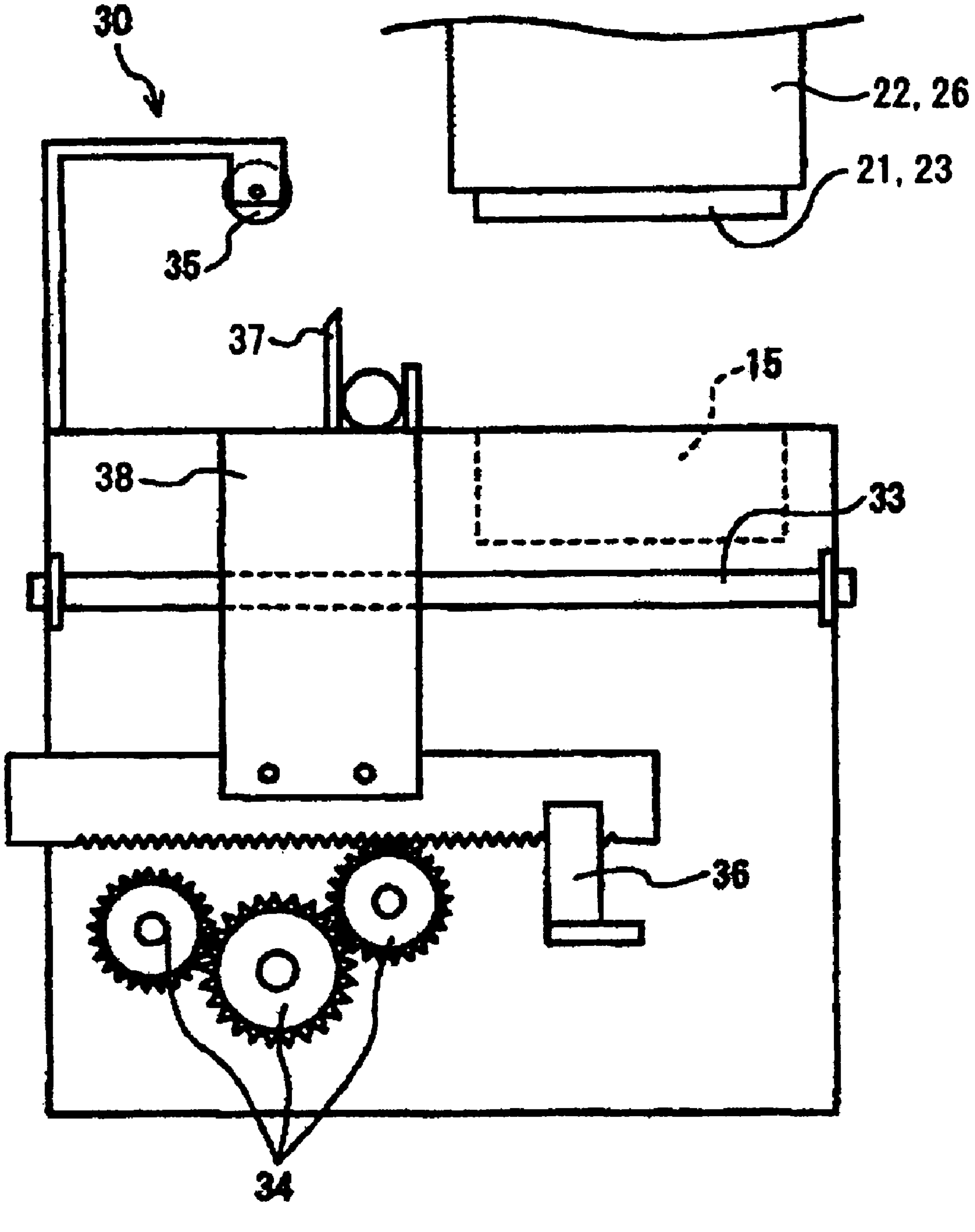
FIG. 3 is a front view of a wiper unit in the inkjet printer according to the embodiment of the present invention.
Figure 4:
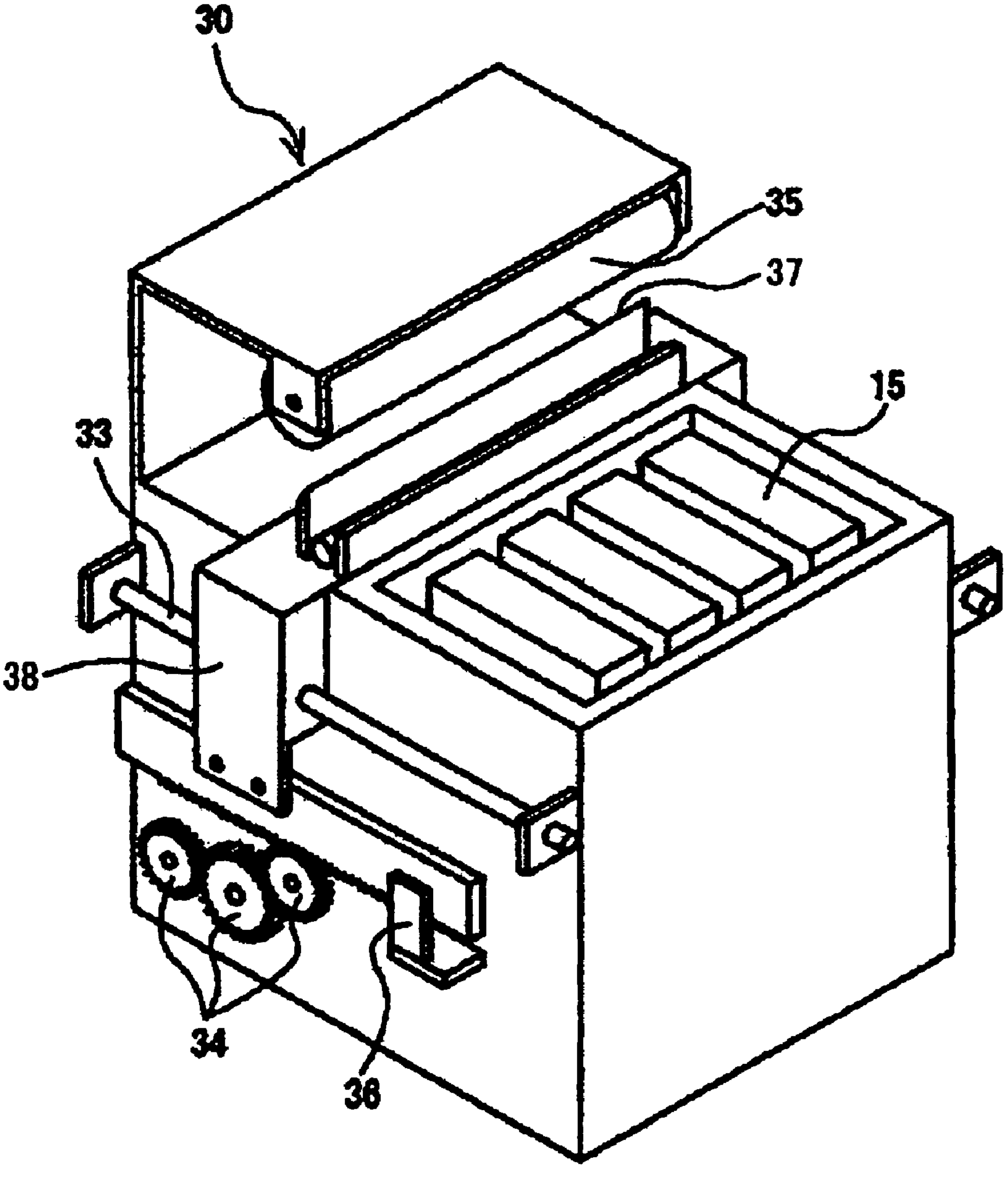
FIG. 4 is a perspective view of the wiper unit in the inkjet printer according to the embodiment of the present invention.

The inkjet printer 1 is further provided with a maintenance station 40 for the first print head 23 on the right-hand end of the guide rail 12. The maintenance station 40 includes, as shown in FIGS. 3 and 4, a wiper unit 30 to wipe inks from a nozzle surface of the first print head 23 and a purging unit 41 to aspirate the ink containing air bubbles from the nozzle surface of the first print head 23. The purging unit 41 includes, as shown in FIG. 3, a suction cap 15 which can be closely attached to and separated from the nozzle surface of the first print head 23, a valve 42 to adjust air pressure in the suction cap 15, a suction pump 43 to aspirate the ink in the nozzles, a waste ink tank 44 to store the aspirated ink, a waste ink valve 45 to control flows of the ink to the waste ink tank 44, and tubes 46 to connect the above components. Behaviors of the purging unit 41 will be described later in detail.

Further inside the casing 10, the inkjet printer 1 is provided with a guide rail 11, which is arranged in parallel with the main scanning direction to guide the second carriage 22 with the second print head 21 there-along. Furthermore, a second carriage motor 24, a pulley (not shown), and a carriage belt (not shown) are provided. The second carriage motor 24 is in vicinity to one end (an upper end in FIG. 1 in the present embodiment) of the guide rail 11, and the pulley is in vicinity to the other end (a lower end in FIG. 1). The carriage belt is provided to connect the second carriage motor 24 and the pulley. The carriage belt is fixed to a rear side of the second carriage 22 so that the second carriage 22 can be reciprocated along the guide rail 11 as the carriage belt is driven by the second carriage motor 24.

On the left-hand side of the guide rail 11, as shown in FIG. 1, a maintenance station 50 for the second print head 21 is provided on the left-hand end of the guide rail 11. The maintenance station 50 includes a wiper unit, which is similar to the wiper unit 30 in the maintenance station 40, and a purging unit 91 for the second print head 21, which is in a similar configuration to the purging unit 41, to aspirate ink containing air bubbles from a nozzle surface of the second print head 21. The purging unit 91 includes a suction cap 15, which is in a similar configuration to the purging unit 41, a valve 92, a suction pump 93, a waste tank 94, and a waste ink valve 95, and tubes 96.

Next, platens 5, 6 of the inkjet printer 1 according to the present embodiment to hold the recording media will be described. The inkjet printer 1 is provided with a pair of platens, a first platen 5 and a second platen 6, which have shapes identical to each other. The first platen 5 and the second platen 6 are movable in parallel with an auxiliary scanning direction, which is substantially perpendicular to the main scanning direction of the print heads 21, 23 (i.e., a horizontal direction in FIG. 1).

In order to drive the platens 5, 6, in the auxiliary direction respectively, the inkjet printer 1 is provided with a first drive mechanism 7 and a second drive mechanism 8, which are arranged in parallel with each other. The first drive mechanism 7 is to drive the first platen 5 and includes guide rails 77, 77 (see FIG. 2) and a first platen drive motor 71. The first platen drive motor 71, which is a stepping motor in the present embodiment, is arranged on one end (a right-hand end in FIG. 1) of each of the guide rails 77, 77. The first platen drive motor 71 is arranged in the vicinity of a rear end (the right-hand end in FIG. 1) in the casing 10. As the first platen drive motor 71 is activated, the first platen 5 is reciprocated in the auxiliary direction along the guide rails 77, 77.

Similarly, the second drive mechanism 8 is provided to drive the second platen 6 and includes guide rails 87, 87 (see FIG. 2) and a second platen drive motor 81, which is a stepping motor. The second platen 6 is reciprocated in the auxiliary direction along the guide rails 87, 87 as the second platen drive motor 81 is activated. The second platen drive motor 81 is arranged in the vicinity of the rear end (the right-hand end in FIG. 1) in the casing 10.

Each of the first platen 5 and the second platen 6 is formed to have a pentagonal shape in a plane view. More specifically, a front end of each platen is formed in an obtuse V-like shape protruding toward the front of the inkjet printer 1 so that the recording medium (i.e., a T-shirt in the present embodiment) can be placed horizontally over a top surface of the platen. In the present embodiment, hereinafter, a recording medium (i.e., a piece of fabric in the present embodiment) being set over the first platen 5 is referred to as a first recording medium, and a recording medium being set over the second platen 6 is referred to as a second recording medium.

The inkjet printer 1 is further provided with a first obstacle sensor 55 and a second obstacle sensor 65 on the front side (left-hand side in FIG. 1) with respect to the guide rail 11 above the first platen 5 and the second platen 6 respectively. The first obstacle sensor 55 and the second obstacle sensor 65 detect height of objects (i.e., the recording media) on the first and the second platens 5, 6 respectively. The first obstacle sensor 55 includes a sensing plate 56, shafts 57, 57, and shaft supports 58, 58. The sensing plate 56, extending in the main scanning direction, is positioned in the first obstacle sensor 55 to have a predetermined clearance between a lower end thereof and a top surface of the platen 5. The sensing plate 56 is fixed to the shafts 57, 57, which are rotatably supported by the shaft supports 58, 58 respectively. The second obstacle sensor 65 is in a similar configuration to the first obstacle sensor 55 and includes a sensing plate 66, shafts 67, 67, and shaft supports 68, 68. When the pieces of fabric placed over the first and the second platens 5, 6 have creases which are higher than the predetermined height, the creases become in contact with the lower ends of the sensing plates 56, 66 while the pieces of fabric are conveyed in the inkjet printer 1. Accordingly, the sensing plates 56, 66 are rotated by the creases so that the creases are detected. When the sensing plates 56, 66 are rotated, presence of the obstacles is notified to the operator in a known error indicating method, such as by a warning sound.

Furthermore, as shown in FIG. 2, trays 4, 4, 4, 4 having surfaces which are substantially parallel with the top surfaces of the first and the second platens 5, 6 are provided at positions below the first and the second platens 5, 6. The trays 4, 4, 4, 4 are arranged below each side of the first and the second platens 5, 6 and fixed to the first and the second platens 5, 6 respectively so that the trays 4, 4, 4, 4 are moved along with the first and the second platens 5, 6. The trays 4, 4, 4, 4 are provided to receive overhanging portions of the recording medium such as sleeves of the T-shirt, which are not held by the platens 5, 6, so that the trays 4, 4, 4, 4 can prevent the overhanging portions from interfering the base 2 when the T-shirts are installed on the first platen 5 and the second platen 6.

The inkjet printer 1 is provided with a first ink cartridge storage unit 32, in which ink cartridges 321, 322, 323, 324 are stored, on the right-hand side in the casing 10, as shown in FIG. 2. The ink cartridges 321, 322, 323, 324, containing white ink, are fixed in the first ink cartridge storage unit 32 by fixing members 325, 326, 327, 328 respectively. The white ink can be used in a white printing operation, which is a printing operation to reproduce white pixels and to form a base layer on a dark-colored (i.e., black) recording medium so that pixels in the other colors can be reproduced in a colored-printing operation clearly over the base layer regardless of a color of the recording medium.

The inkjet printer 1 is further provided with a second ink cartridge storage unit 31, in which ink cartridges 311, 312, 313, 314 are stored, on the left-hand side in the casing 10, as shown in FIG. 2. The ink cartridges 311, 312, 313, 314, containing C, M, Y, K inks respectively, are fixed in the second ink cartridge storage unit 31 by fixing members 315, 316, 317, 318 respectively. The ink cartridges 321, 322, 323, 324 and 311, 312, 313, 314 are connected to the first and the second print heads 23, 21 respectively through ink supplying tubes (not shown).

As shown in FIGS. 1 and 2, the inkjet printer 1 is further provided with a first operation panel 28 on the right-hand side of the front thereof. The first operation panel 28 includes a plurality of operation buttons, through which a user's operations to manipulate the first platen 5, the first or the second print head 23 (21), and the first or the second carriage 26 (22) are inputted, such as a first print start button 281 to instruct printing on the fabric placed on the first platen 5 and a first cancel button 283 to instruct cancellation of the printing instruction. Further, the first operation panel 28 includes a display 284 (an LCD (liquid crystal display) in the present embodiment) to display various information concerning the operation, a first print data obtain button 282 to instruct obtainment of print data, a data lamp 286 to indicate reception of the print data, and an error lamp 287 to indicate an operation error. The first operation panel 28 further includes a speaker 285 to generate a warning sound.

Also as shown in FIGS. 1 and 2, the inkjet printer 1 is provided with a second operation panel 27 on the left-hand side of the front thereof. The second operation panel 27 includes a plurality of operation buttons, through which a user's operations to manipulate the second platen 6, the second or the first print head 21 (23), and the second or the first carriage 22 (26) are inputted, such as a second print start button 271 to instruct printing on the fabric placed on the second platen 6 and a second cancel button 273 to instruct cancellation of the printing instruction. Further, the second operation panel 27 includes a display 274 (an LCD in the present embodiment) to display various information concerning the operation, a second print data obtain button 272 to instruct obtainment of print data, a data lamp 276 to indicate reception of the print data, and an error lamp 277 to indicate an operation error. The second operation panel 27 also includes a speaker 275 to generate a warning sound.

Next, referring to FIGS. 3 and 4, behaviors of the wiper unit 30 in each of the maintenance stations 40, 50 will be described. FIG. 3 is a front view of the wiper unit 30 in the inkjet printer 1 according to the embodiment of the present invention. FIG. 4 is a perspective view of the wiper unit 30 in the inkjet printer 1 according to the embodiment of the present invention.

The wiper unit 30 includes a wiper 37, a wiper mount 38, a guide 33, gears 34, a wiper cleaner 35, and a sensor 36. The wiper 37 wipes inks off of the nozzle surface of the first print head 23 or the second print head 21. The wiper mount 38 is a unit on which the wiper 37 is mounted. The guide 33 guides the wiper mount 38 there-along. The gears 34 are a drive force transmitter to transmit drive force from a motor (not shown) to the wiper mount 38 so that the wiper mount 38 is moved along the guide 33. The wiper cleaner 35 cleans the wiper 37 after wiping the nozzle surface and maintains the wiper 37 in condition for wiping. The sensor 36 detects an original point for the wiper mount 38 so that a position of the wiper mount 38 being moved is controlled with respect to the original point.

Behaviors of the wiper unit 30 configured as above will be described herein below. When a white printing operation is completed, the first carriage 26 having been driven to eject the white ink onto one of the first and the second recording media is moved from an ending position to a first maintenance position. The ending position according to the present embodiment refers to a position at which the first print head 23 is located when the white printing operation completes. The ending position includes a first ending position, at which the first print head 23 is located when the white printing operation to the first recording medium completes, and a second ending position, at which the first print head 23 is located when the white printing operation to the second recording medium completes. The first maintenance position refers to a position, as shown in FIG. 1, which corresponds to and in the vicinity of the maintenance station 40. With the first print head 23 located at the ending position, the wiper unit 30 drives the motor to move the wiper mount 38 along the guide 33 so that with the nozzle surface of the first print head 23 is wiped by the wiper 37 (i.e., first after-print wiping). Thereafter, the wiper unit 30 manipulates a drive unit (not shown) to uplift the suction cap 15 so that the suction cap 15 is attached to the nozzle surface of the first print head 23 (i.e., first capping).

Behaviors of the wiper unit 30 are similar in a colored-printing operation with the second print head 21 to eject the colored inks onto one of the first and the second recording media. When a colored-printing operation is completed, the second carriage 22 having been driven to eject the colored inks onto one of the first and the second recording media is moved from an ending position to a second maintenance position. The ending position refers to a position, at which the second print head 21 is located when the colored-printing operation completes, and includes the first ending position and the second ending position. The second maintenance position refers to a position, as shown in FIG. 1, which corresponds to and in the vicinity of the maintenance station 50. With the second print head 21 located at the ending position, the wiper unit 30 drives the motor to move the wiper mount 38 along the guide 33 so that with the nozzle surface of the second print head 21 is wiped by the wiper 37 (i.e., second after-print wiping). Thereafter, the wiper unit 30 manipulates a drive unit (not shown) to uplift the suction cap 15 so that the suction cap 15 is attached to the nozzle surface of the second print head 21 (i.e., second capping).

When a white printing operation starts, the wiper unit 30 manipulates the drive unit to shift the suction cap 15 downward so that the suction cap 15 is detached from the nozzle surface of the first print head 23 (i.e., first uncapping). Thereafter, the wiper unit 30 drives the motor to move the wiper mount 38 along the guide 33 so that the nozzle surface of the first print head 23 is wiped by the wiper 37 (i.e., first pre-print wiping). The first carriage 26 is moved from the first maintenance position corresponding to the maintenance station 40 to a starting position. The starting position according to the present embodiment refers to a position at which the first print head 23 starts ejecting the ink onto one of the first and the second recording media. The starting position includes a first starting position, at which the first print head 23 starts ejecting the ink onto the first recording medium, and a second starting position, at which the first print head 23 starts ejecting the ink onto the second recording medium. The first print head 23 moved to the starting position is driven according to the white printing operation.

Behaviors of the wiper unit 30 in a colored-printing operation are similar to the above behaviors of the wiper unit 30 in the white printing operation. When a colored-printing operation is started, the wiper unit 30 manipulates the drive unit to shift the suction cap 15 downward so that the suction cap 15 is detached from the nozzle surface of the second print head 21 (i.e., second uncapping). Thereafter, the wiper unit 30 drives the motor to move the wiper mount 38 along the guide 33 so that the nozzle surface of the second print head 21 is wiped by the wiper 37 (i.e., second pre-print wiping). The second carriage 22 is moved from the second maintenance position corresponding to the maintenance station 50 to a second starting position. The first print head 23 moved to the starting position is driven according to the colored-printing operation.

Figure 5:
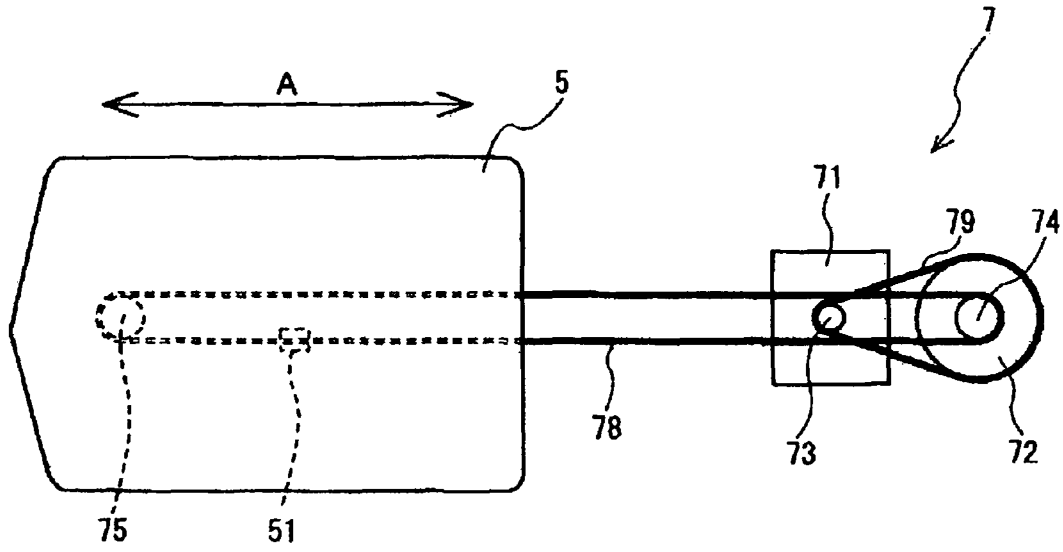
FIG. 5 is an illustrative top view of a drive mechanism of a platen according to the embodiment of the present invention.
Figure 6:
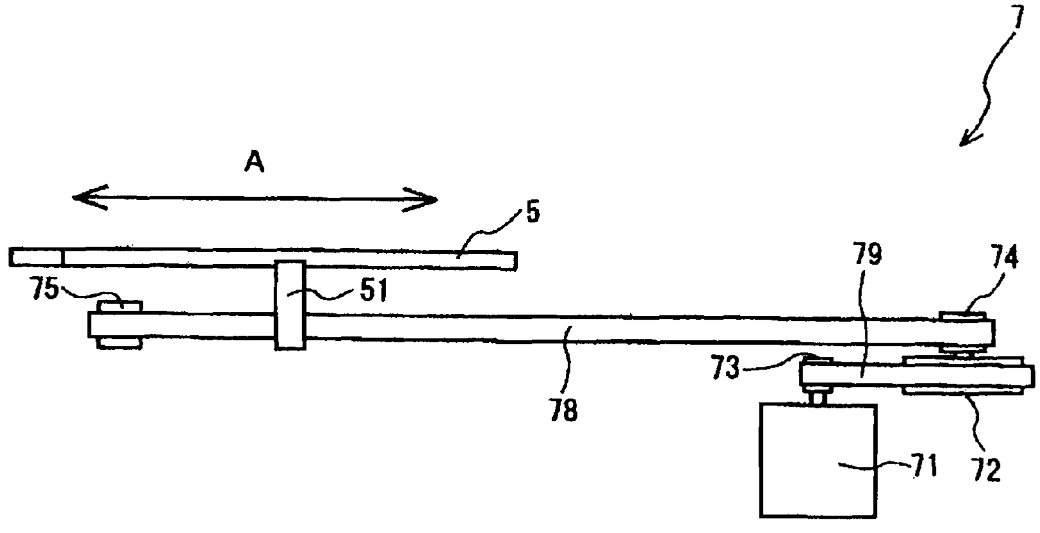
FIG. 6 is an illustrative side view of the drive mechanism of the platen according to the embodiment of the present invention.

Next, referring to FIGS. 5 and 6, the first drive mechanism 7 to drive the first platen 5 will be described. FIG. 5 is an illustrative top view of the first drive mechanism 7 according to the embodiment of the present invention. FIG. 6 is an illustrative side view of the first drive mechanism 7 according to the embodiment of the present invention. The left-hand side which appears in FIGS. 5 and 6 corresponds to the front of the inkjet printer 1, and the right-hand side which appears in FIGS. 5 and 6 corresponds to the rear of the inkjet printer 1.

The first drive mechanism 7 is provided with a motor pulley 73, a greater pulley 72, and a motor belt 79, and the motor belt 79 encircles the motor pulley 73 and the greater pulley 72. As the first platen drive motor 71 rotates, the motor pulley 73 is rotated, and the greater pulley 72 is rotated accordingly. The first drive mechanism 7 is provided with a first belt pulley 74, which is attached to the greater pulley 72 to rotate coaxially and in synchronization with the greater pulley 72. The first platen drive motor 71, the motor pulley 73, the greater pulley 72, and the first belt pulley 74 are arranged in the casing 10 in positions lower than a horizontal plane on which the first platen 5 is shifted. Further, a timing belt 78 is provided to encircle the first belt pulley 74 and a second belt pulley 75. The second belt pulley 75 is provided in a position closer to the front of the inkjet printer 1 (i.e., on the left-hand side in FIGS. 1, 5, and 6). A diameter of the second belt pulley 75 is substantially equivalent to a diameter of the first belt pulley 74.

In the inkjet printer 1, the first belt pulley 74 and the second belt pulley 75 are arranged in positions such that a line connecting a rotation axis of the first belt pulley 74 and a center of the second belt pulley 75 is perpendicular to the main scanning direction of the first print head 23 (i.e., an axial direction of the guide rail 12), and the timing belt 78 is oriented perpendicularly to the main scanning direction of the first print head 23. The timing belt 78 is fixed to the first platen 5 by a platen attachment 51 so that the first platen 5 is shifted in a direction indicated by an arrow A in FIGS. 5 and 6 (i.e., the auxiliary scanning direction and a front-rear direction of the inkjet printer 1) as the timing belt 78 is shifted in accordance with rotation of the first belt pulley 74. Thus, rotation of the first platen drive motor 71 is conveyed to the motor pulley 73, the motor belt 79, the greater pulley 72, the first belt pulley 74, the timing belt 78, the second belt pulley 75, and the platen attachment 51, and thus converted into horizontal movement to shift the first platen 5 in the auxiliary direction.

The second drive mechanism 8 is in a similar configuration to the configuration of the first drive mechanism 7, and description of that is herein omitted.

Figure 7:
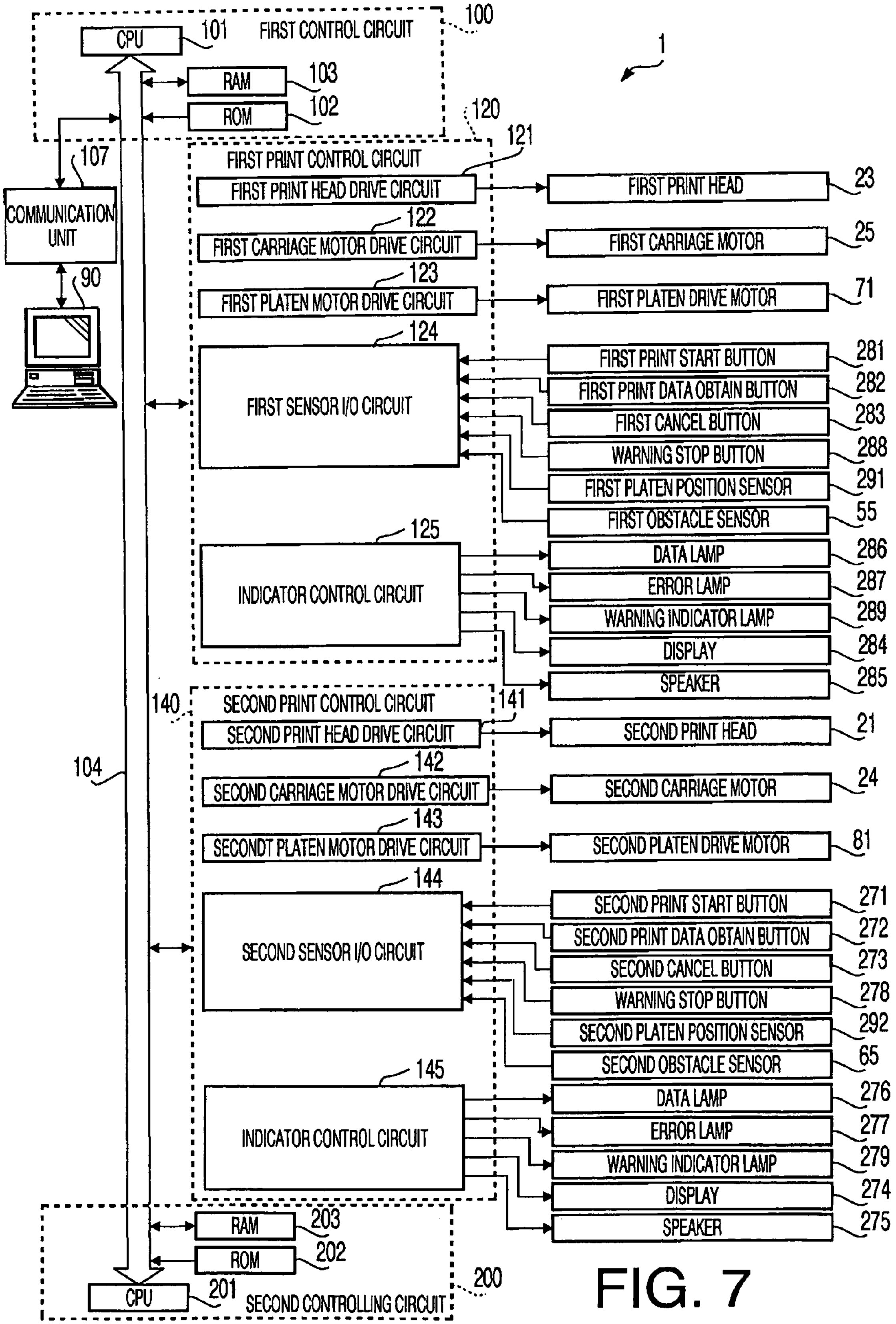
FIG. 7 is a block diagram to illustrate an electrical configuration of the inkjet printer according to the embodiment of the present invention.

Next, referring to FIG. 7, an electrical configuration of the inkjet printer 1 according to the present embodiment will be described. FIG. 7 is a block diagram to illustrate the electrical configuration of the inkjet printer 1 according to the embodiment of the present invention. The inkjet printer 1 includes a first controlling circuit 100, a second controlling circuit 200, a first print control circuit 120, and a second print control circuit 140. The first controlling circuit 100 and the first print control circuit 120 control behaviors of a first printing unit, which includes the first platen 5, the first print head 23, and the first carriage 26. The second controlling circuit 200 and the second print control circuit 140 control behaviors of a second printing unit, which includes the second platen 6, the second print head 21, and the second carriage 22.

The first controlling circuit 100 is a circuit to control a printing operation to print an image on the fabric supported by the first platen 5. The first controlling circuit 100 is provided within the first operation panel 28 and includes a CPU 101, a ROM 102 to store various controlling programs to be executed by the CPU 101, and a RAM 103 to temporarily store various data. The second controlling circuit 200 is a circuit to control a printing operation to print an image on the fabric supported by the second platen 6. The second controlling circuit 140 is provided within the second operation panel 27 and includes a CPU 201, a ROM 202, and a RAM 203, similarly to the first controlling circuit 100. The first controlling circuit 100 and the second controlling circuit 200 are connected to each other through a bus 104 to exchange information therebetween and share various information necessary to control the operations. Further, the first and the second controlling circuits 100, 200 are connected with the first print control circuit 120 and the second print control circuit 140 through the bus 104. Furthermore, the first and the second controlling circuits 100, 200 are connected with a PC (personal computer) 90, in which print data is generated, via a communication unit 107.

The first print control circuit 120 is a circuit to control behaviors of the first platen 5, the first print head 23, and the first carriage 26 and includes a first print head drive circuit 121, a first carriage motor drive circuit 122, and a first platen motor drive circuit 123. The first print head drive circuit 121 is to activate and inactivate piezoelectric actuators in each channel in the first print head 23. The first carriage motor drive circuit 122 is to activate and inactivate the first carriage motor 25, and the first platen motor drive circuit 123 is to activate and inactivate the first platen drive motor 71. The first print control circuit 120 further includes a first sensor I/O circuit 124 and an indicator control circuit 125. The first sensor I/O circuit 124 accepts information inputted by the first print start button 281, the first print data obtain button 282, the first cancel button 283, a warning stop button 288 to stop the warning sound from the speaker 285, a first platen position sensor 291, which is to detect a position of the first platen 5, and the first obstacle sensor 55. The indicator control circuit 125 controls the data lamp 286, the error lamp 287, a warning indicator lamp 289, which indicates the warning stop button 288 needs to be operated, the display 284, and the speaker 285.

The second print control circuit 140 is a circuit to control behaviors of the second platen 6, the second print head 21, and the second carriage 22 and includes a second print head drive circuit 141, a second carriage motor drive circuit 142, and a second platen motor drive circuit 143. The second print head drive circuit 141 is to activate and inactivate piezoelectric actuators in each channel in the second print head 21. The second carriage motor drive circuit 142 is to activate and inactivate the second carriage motor 24, and the second platen motor drive circuit 143 is to activate and inactivate the second platen drive motor 81. The second print control circuit 140 further includes a second sensor I/O circuit 144 and an indicator control circuit 145. The second sensor I/O circuit 144 accepts information inputted by the second print start button 271, the second print data obtain button 272, the second cancel button 273, a warning stop button 278 to stop the warning sound from the speaker 275, a second platen position sensor 292, which is to detect a position of the second platen 6, and the second obstacle sensor 65. The indicator control circuit 145 controls the data lamp 276, the error lamp 277, a warning indicator lamp 279, which indicates the warning stop button 278 needs to be operated, the display 274, and the speaker 275.

Figure 8:
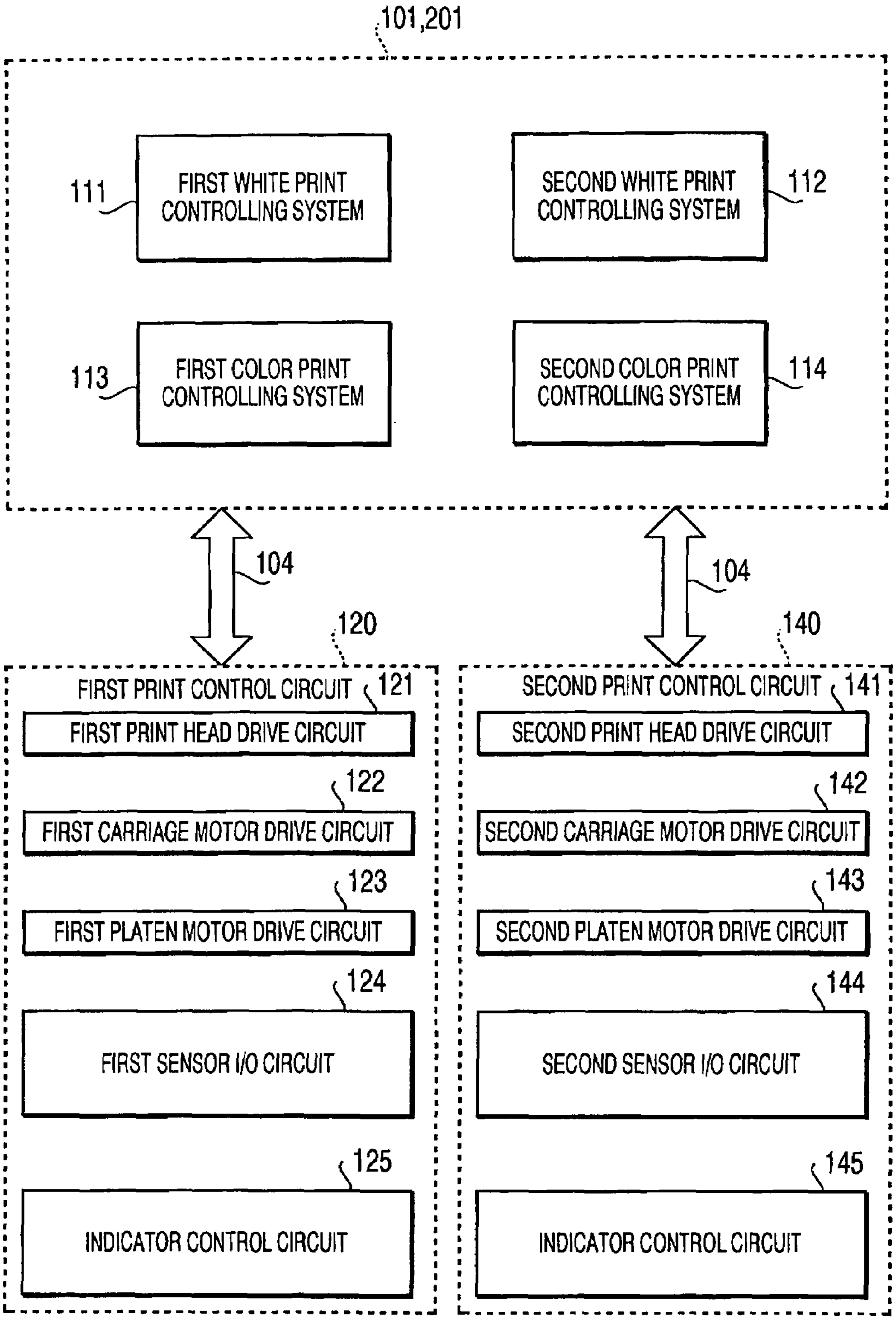
FIG. 8 is a block diagram to illustrate controls taken over a first print controlling system and a second print controlling system within the inkjet printer according to the embodiment of the present invention.

FIG. 8 is a block diagram to illustrate controls taken over a first white print controlling system 111, a second print controlling system 112, a first color print controlling system 113, and a second color print controlling system 114 by the CPU 101 of the first controlling circuit 100 and the CPU 201 of the second controlling circuit 200 in cooperation with each other within the inkjet printer 1 according to the embodiment of the present invention.

The first white print controlling system 111 includes controlling of white printing operations with the first recording medium with the first print head 23. In other words, the first white print controlling system 111 controls white printing operations to the first recording medium held by the first platen 5. Therefore, the first white print controlling system 111 transmits controlling signals to the first print control circuit 120 through the bus 104 in order to control the first print head drive circuit 121, the first carriage motor drive circuit 122, and the first platen motor drive circuit 123 and to drive the first print head 23, the first carriage motor 25, and the first platen drive motor 71.

The second white print controlling system 112 includes controlling of white printing operations with the second recording medium with the first print head 23. In other words, the second white print controlling system 112 controls white printing operations to the second recording medium held by the second platen 6. Therefore, the second white print controlling system 112 transmits controlling signals to the first print control circuit 120 through the bus 104 in order to control the first print head drive circuit 121 and the first carriage motor drive circuit 122 and to drive the first print head 23 and the first carriage motor 25. Further, the second white print controlling system 112 transmits controlling signals to the second print control circuit 140 through the bus 104 in order to control the second platen motor drive circuit 143 and to drive the second platen drive motor 81.

The first color print controlling system 113 includes controlling of colored printing operations with the first recording medium with the second print head 21. In other words, the first color print controlling system 113 controls colored printing operations to the first recording medium held by the first platen 5. Therefore, the first color print controlling system 113 transmits controlling signals to the first print control circuit 120 through the bus 104 in order to control the first platen motor drive circuit 123 and to drive the first platen drive motor 71. Further, the first color print controlling system 113 transmits controlling signals to the second print control circuit 140 through the bus 104 in order to control the second print head drive circuit 141 and the second carriage motor drive circuit 142 and to drive the second print head 21 and the second carriage motor 24.

The second color print controlling system 114 includes controlling of colored printing operations with the second recording medium with the second print head 21. In other words, the second color print controlling system 114 controls colored printing operations to the second recording medium held by the second platen 6. Therefore, the second color print controlling system 114 transmits controlling signals to the second print control circuit 140 through the bus 104 in order to control the second print head drive circuit 141, the second carriage motor drive circuit 142, and the second platen motor drive circuit 143 and to drive the second print head 21, the second carriage motor 24, and the second platen drive motor 81.

Figure 9:
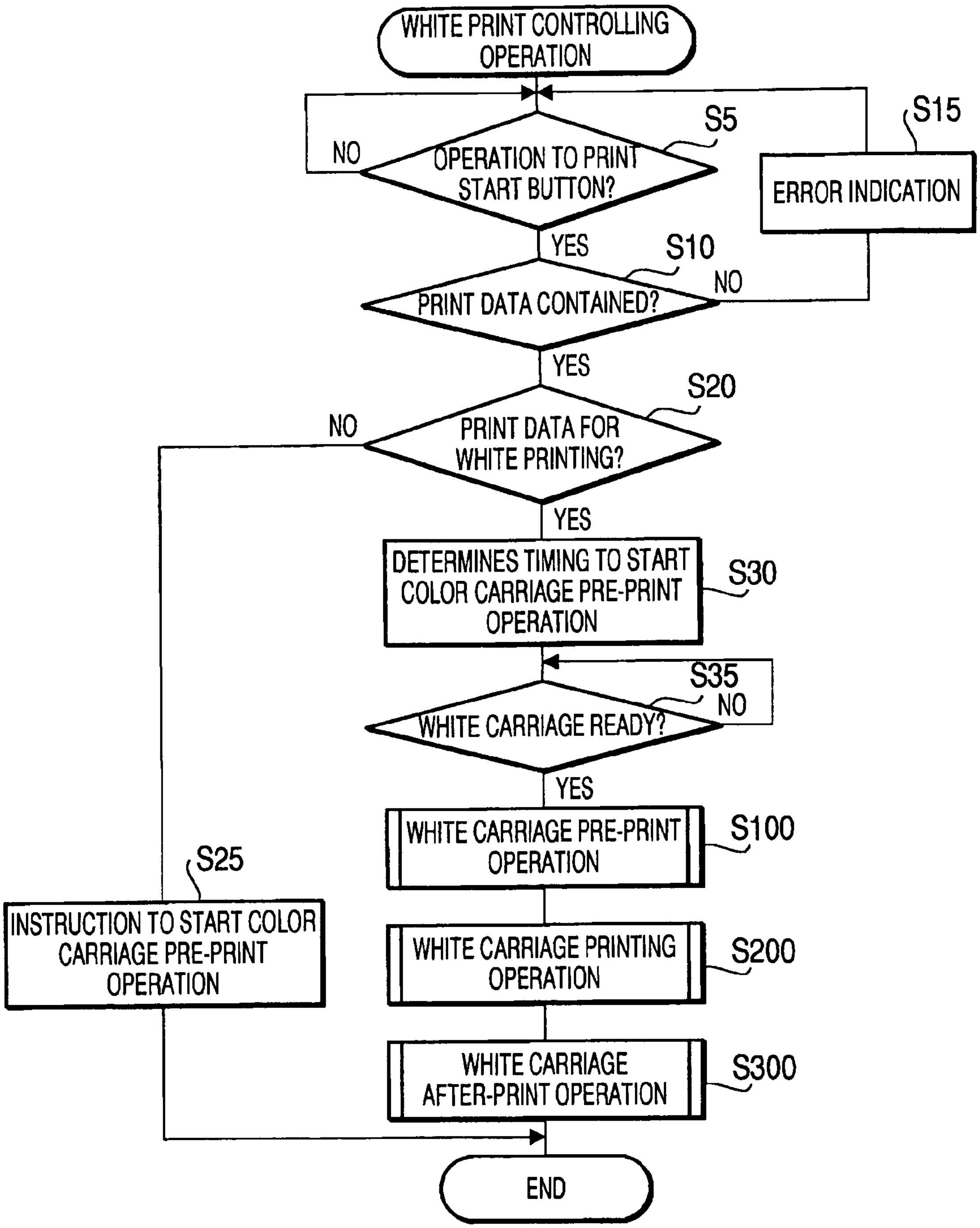
FIG. 9 is a flowchart to illustrate a white print controlling operation to be run in a first white print controlling system and a second white print controlling system in the inkjet printer according to the embodiment of the present invention.
Figure 10:
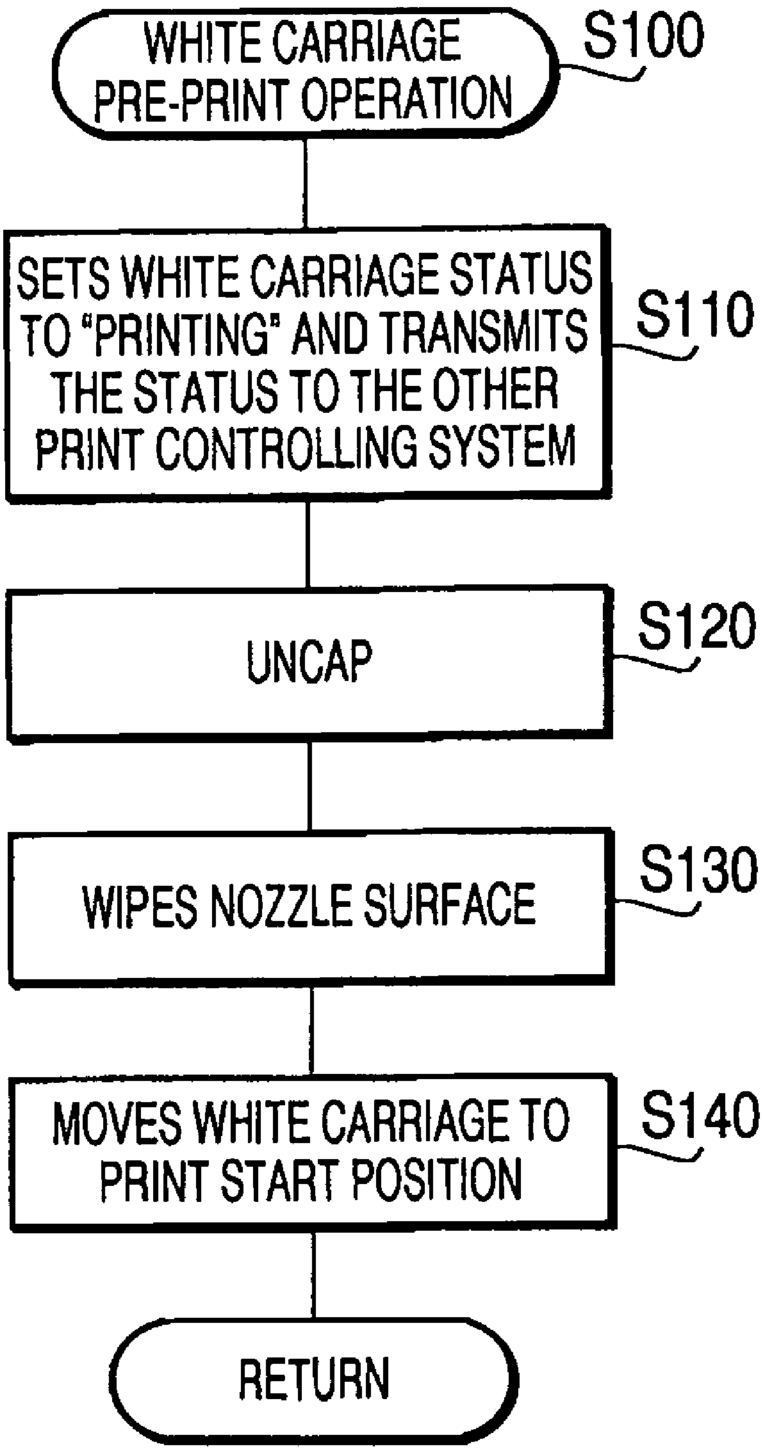
FIG. 10 is a flowchart to illustrate a white carriage pre-print operation to be executed in the inkjet printer according to the embodiment of the present invention.
Figure 11:
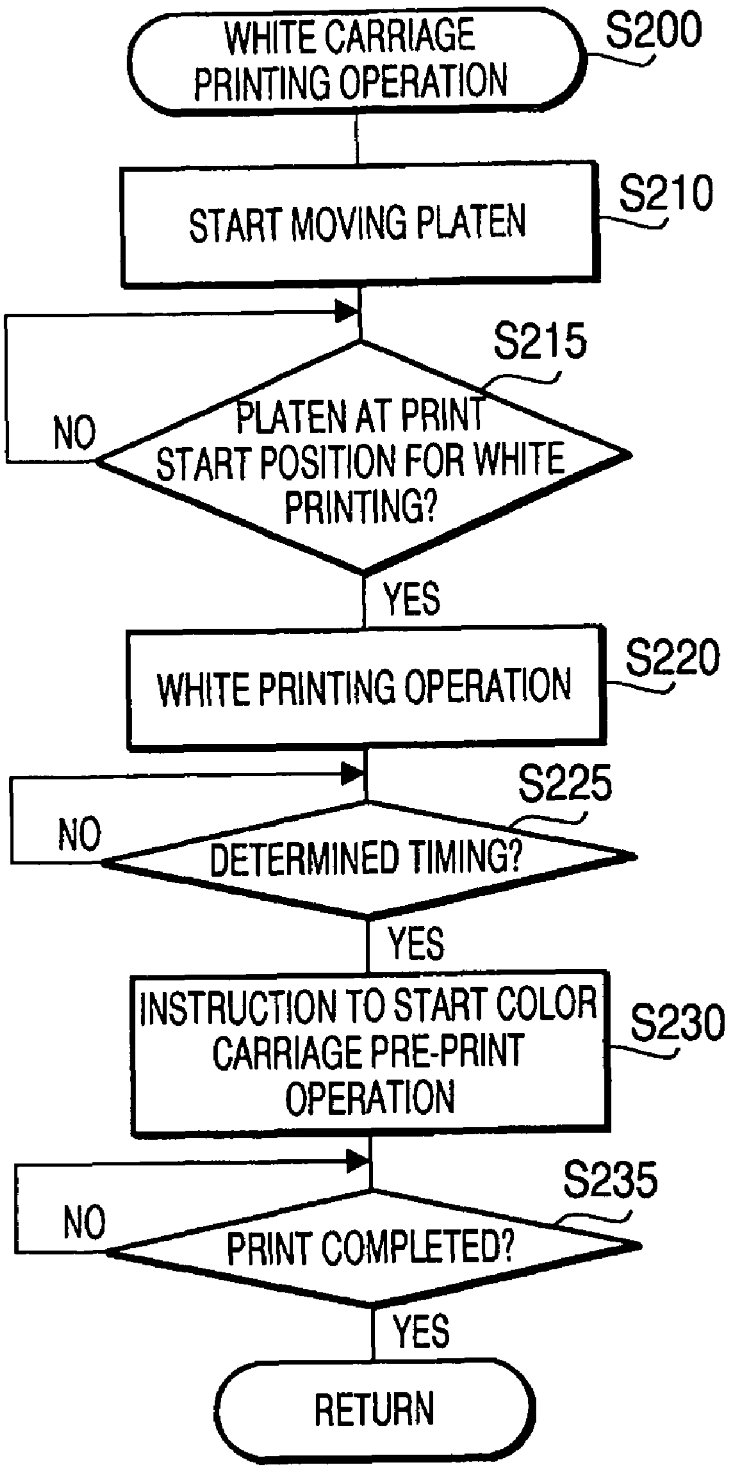
FIG. 11 is a flowchart to illustrate a white carriage printing operation to be executed in the inkjet printer according to the embodiment of the present invention.
Figure 12:
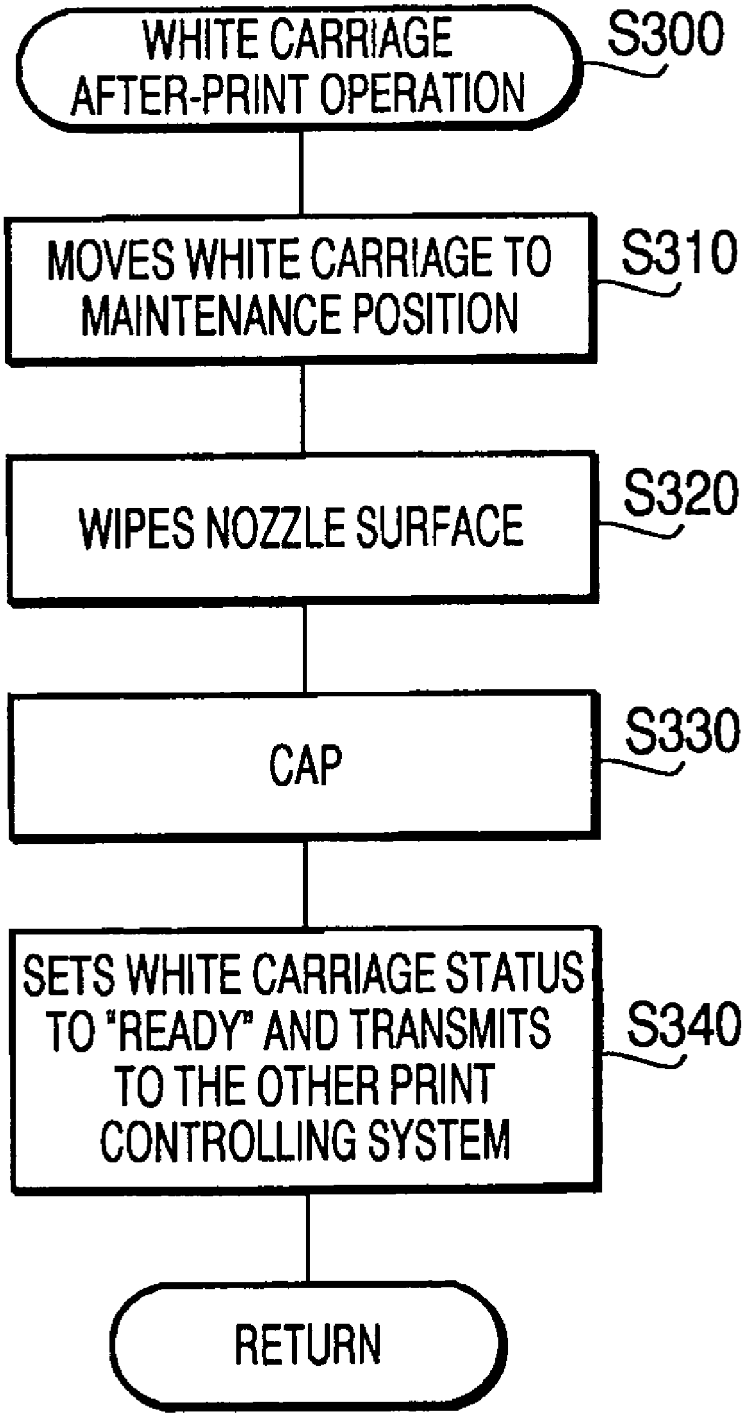
FIG. 12 is a flowchart to illustrate a white carriage after-print operation to be executed in the inkjet printer according to the embodiment of the present invention.
Figure 13:
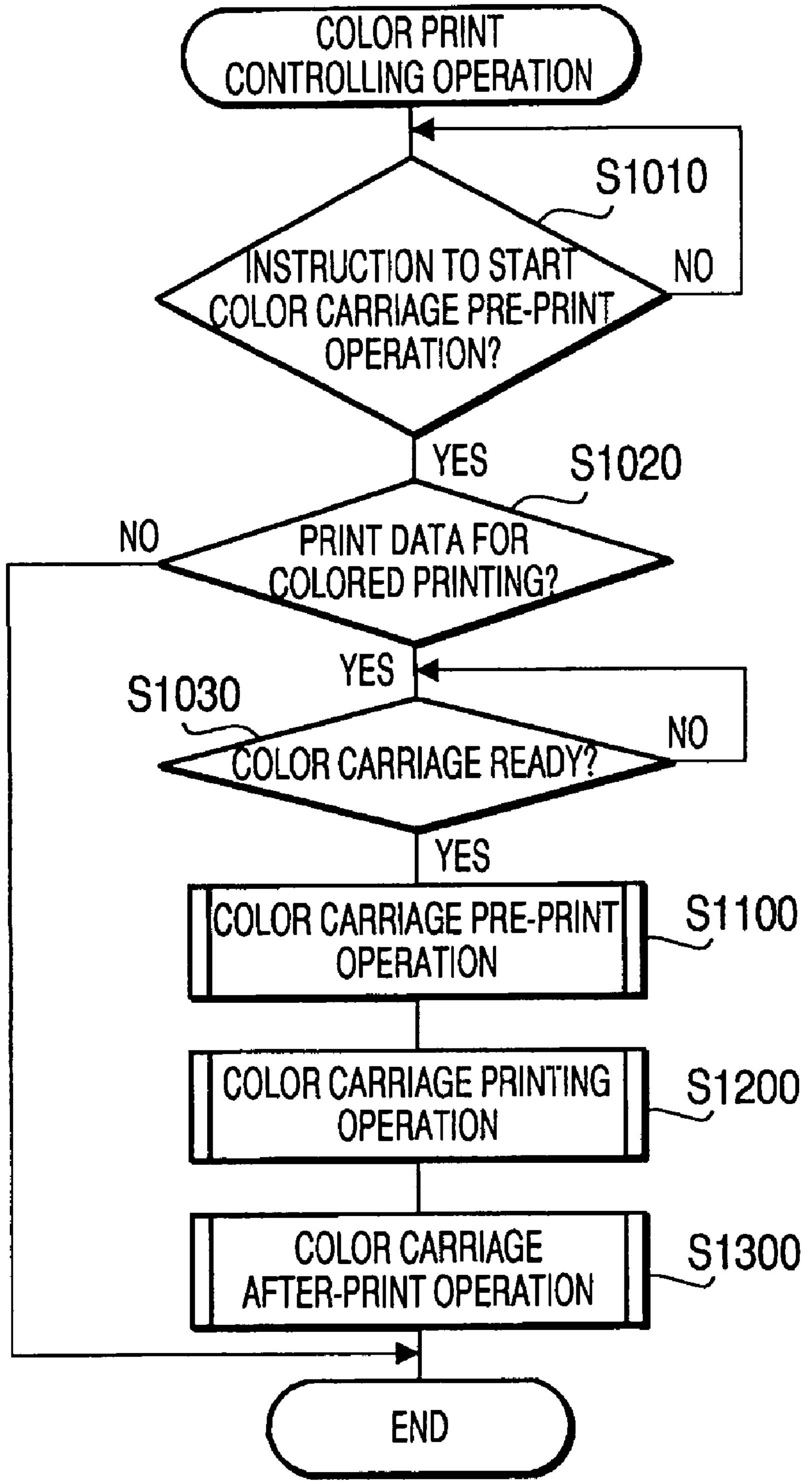
FIG. 13 is a flowchart to illustrate a color print controlling operation to be run in a first color print controlling system and a second color print controlling system in the inkjet printer according to the embodiment of the present invention.
Figure 14:
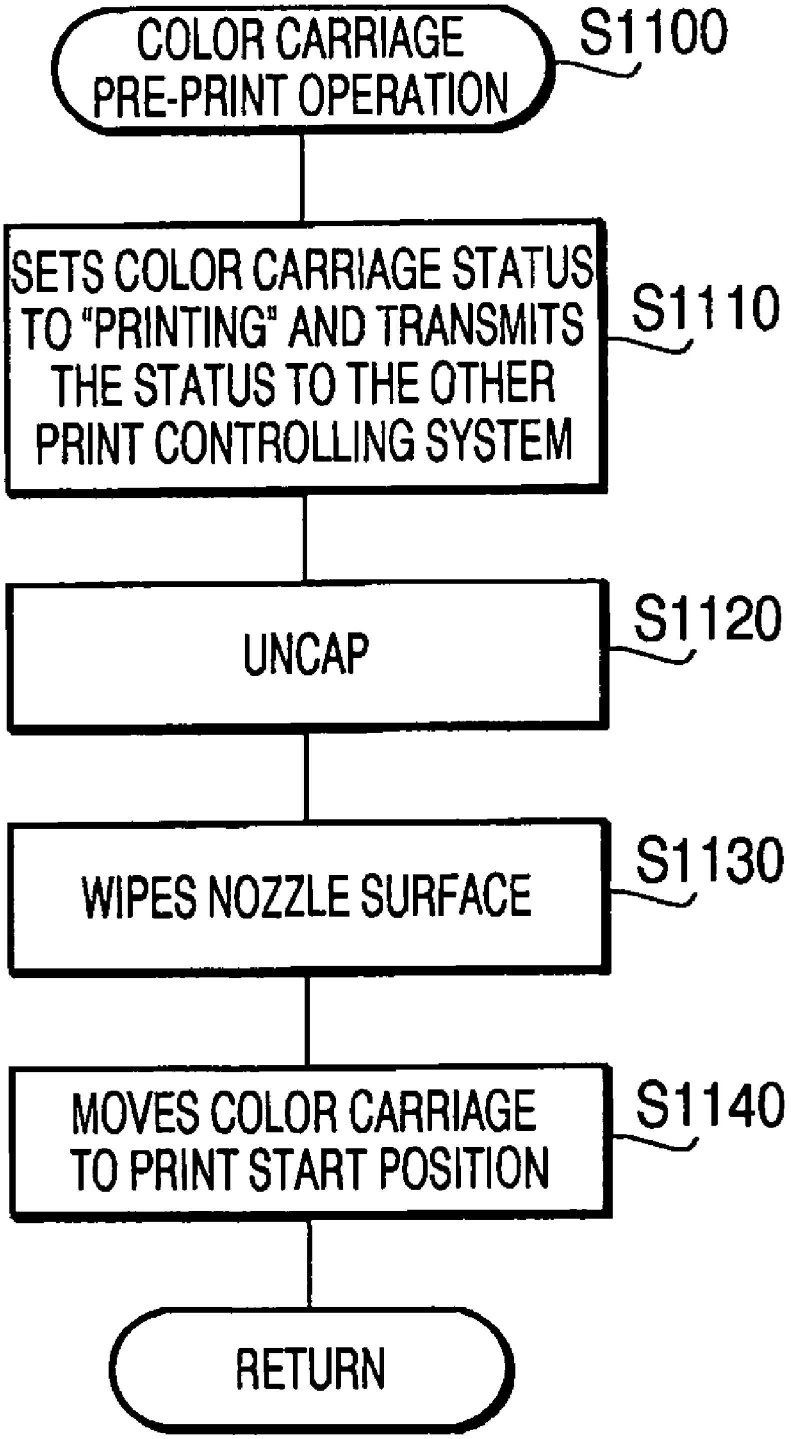
FIG. 14 is a flowchart to illustrate a color carriage pre-print operation to be executed in the inkjet printer according to the embodiment of the present invention.
Figure 15:
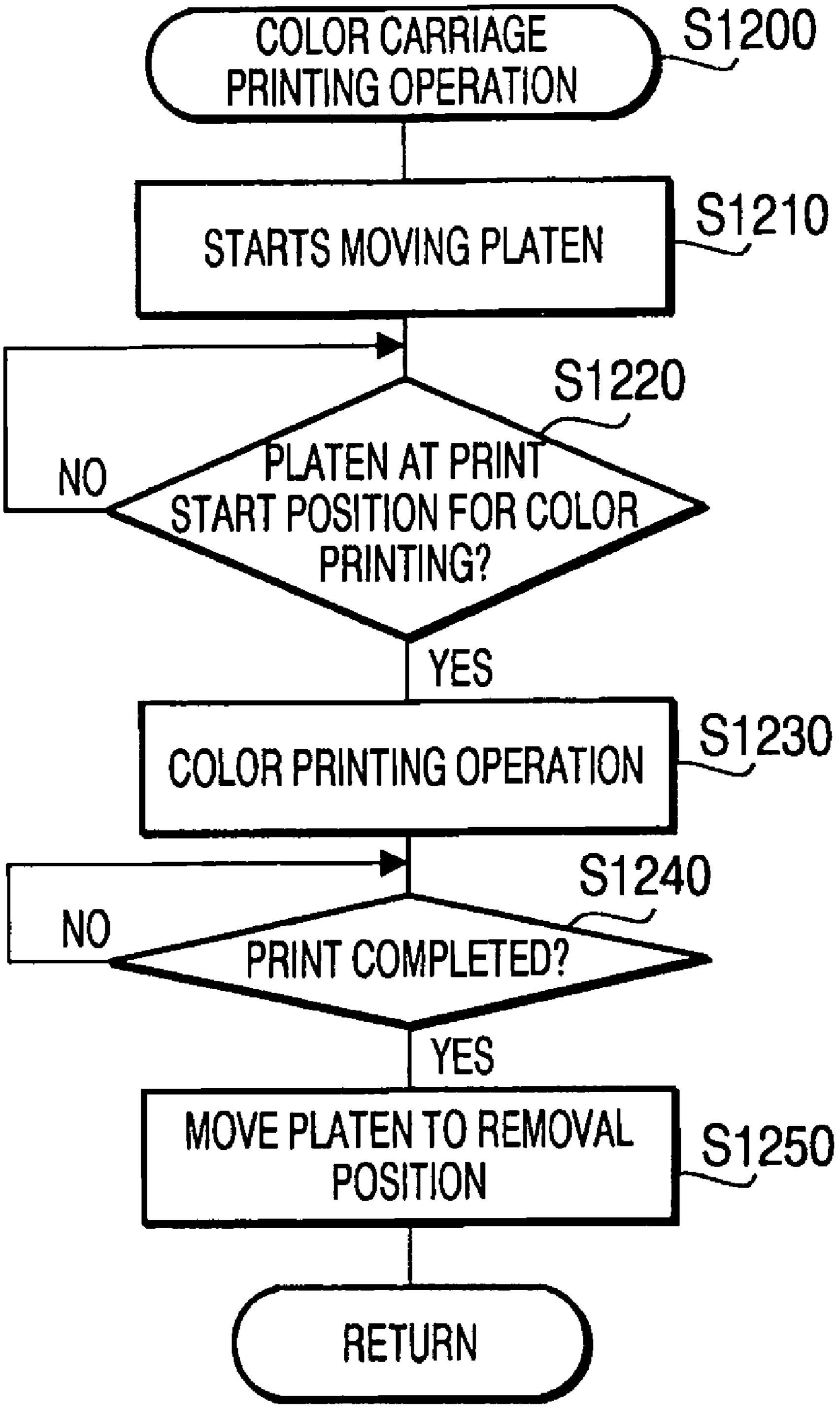
FIG. 15 is a flowchart to illustrate a color carriage printing operation to be executed in the inkjet printer according to the embodiment of the present invention.
Figure 16:
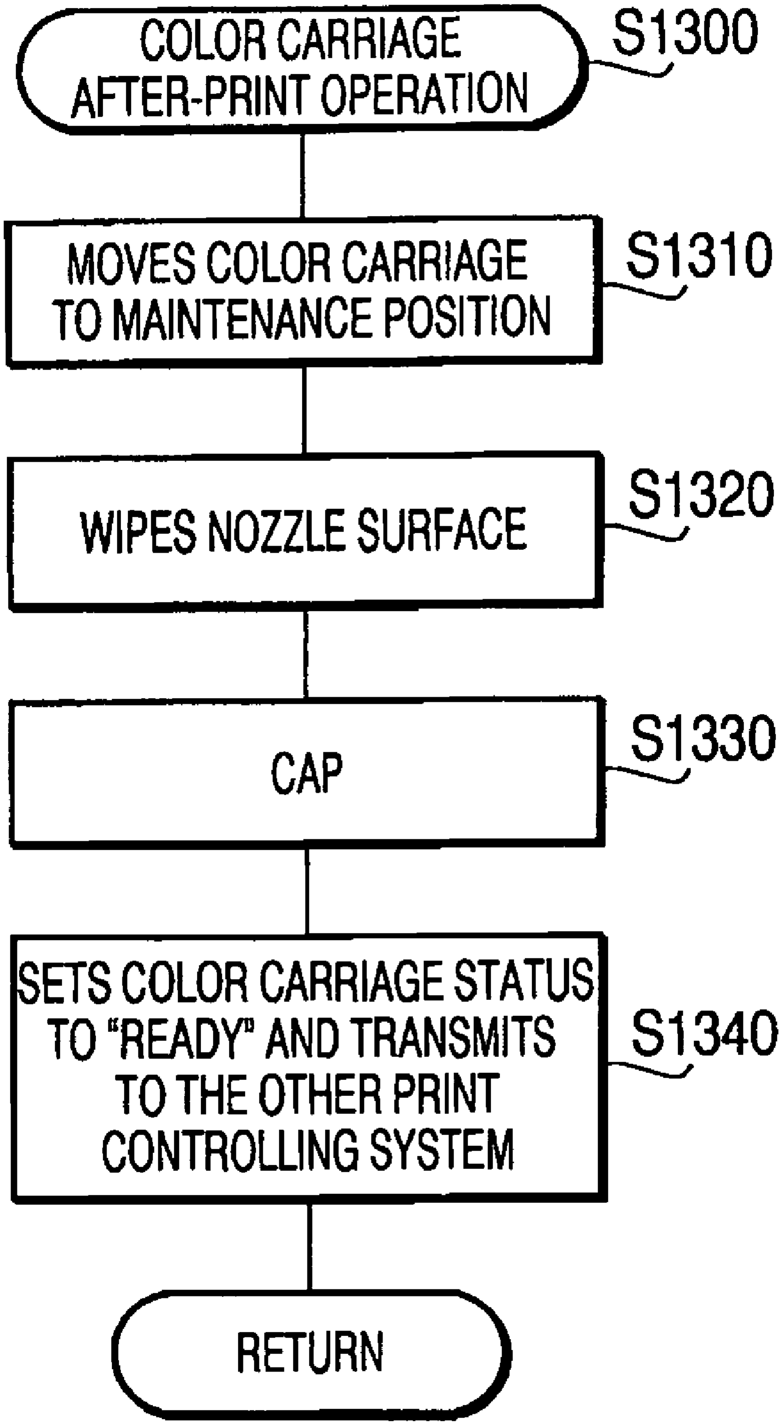
FIG. 16 is a flowchart to illustrate a color carriage after-print operation to be executed in the inkjet printer according to the embodiment of the present invention.

Next, with reference to FIGS. 9-16, control flows of the printing operations in the inkjet printer 1 will be described. FIG. 9 is a flowchart to illustrate a white print controlling operation to be run in the first white print controlling system 111 and the second white print controlling system 112 in the inkjet printer 1 according to the embodiment of the present invention. FIG. 10 is a flowchart to illustrate a white carriage pre-print operation to be executed in the inkjet printer 1 according to the embodiment of the present invention. FIG. 11 is a flowchart to illustrate a white carriage printing operation to be executed in the inkjet printer 1 according to the embodiment of the present invention. FIG. 12 is a flowchart to illustrate a white carriage after-print operation to be executed in the inkjet printer 1 according to the embodiment of the present invention. FIG. 13 is a flowchart to illustrate a color print controlling operation to be run in the first color print controlling system 113 and the second color print controlling system 114 in the inkjet printer 1 according to the embodiment of the present invention. FIG. 14 is a flowchart to illustrate a color carriage pre-print operation to be executed in the inkjet printer 1 according to the embodiment of the present invention. FIG. 15 is a flowchart to illustrate a color carriage printing operation to be executed in the inkjet printer 1 according to the embodiment of the present invention. FIG. 16 is a flowchart to illustrate a color carriage after-print operation to be executed in the inkjet printer 1 according to the embodiment of the present invention.

The white print controlling operation illustrated in FIG. 9 along with the subroutines illustrated in FIGS. 10-12 is conducted simultaneously in parallel with the color print controlling operation illustrated in FIG. 13 along with the subroutines illustrated in FIGS. 14-16 under control of the first white print controlling system 111 or the second white controlling system 112 and under control of the first color print controlling system 113 or the second color print controlling system 114. Further, the flows illustrated in FIGS. 9-16 to be executed by the first white print controlling system 111 and the first color print controlling system 113 can run simultaneously in parallel with the flows illustrated in FIGS. 9-16 to be executed by the second white print controlling system 112 and the second color print controlling system 114. When one of the first and the second white print controlling systems 111, 112 is working as a main controlling system, the other one of the first and the second white print controlling systems 111, 112 is referred to as a subsidiary controlling system. Similarly, when one of the first and the second color print controlling systems 113, 114 is working as a main controlling system, the other one of the first and the second color print controlling systems 113, 114 is referred to as a subsidiary controlling system. In the present embodiment described below, the first white print controlling system 11 and the first color print controlling system 113 behave as main controlling systems.

Further, in the following description, a white carriage refers to the first carriage 26, on which the first print head 23 for ejecting the white ink is mounted, and a color carriage refers to the second carriage 22, on which the second print head 21 for ejecting the colored inks is mounted.

When the white print controlling operation starts, in S5, the first white print controlling system 111 examines as to whether a user of the inkjet printer 1 has operated the first print start button 281 based on input signals provided from the first sensor I/O circuit 124 of the first print controlling circuit 120. When an operation to the first print start button 281 is detected (S5: YES), the flow proceeds to S10.

In S10, the first white print controlling system 111 examines as to whether print data, which is to be used for printing an image in the white ink with the first print head 23 or in the colored inks with the second print head 21, is contained in the RAM 103 of the first control circuit 100. When no print data for white printing or colored printing is contained in the RAM 103 (S10: NO), in S15, the first white print controlling system 111 transmits error signals to the indicator control circuits 125 of the first print control circuit 120 so that the user can be notified of an error, for example, by a warning sound from the speaker 285. In S10, if the print data is contained in the RAM 103 (S10: YES), the control proceeds to S20.

In S20, the first white print controlling system 111 examines as to whether the print data contained in the RAM 103 is data to form the image in the white ink by driving the first print head 23. If the print data does not represent the image to be formed in the white ink (S20: NO), the flow proceeds to S25. If the print data represents the image to be formed in the white ink (S20: YES), the flow proceeds to S30.

In S30, the first white print controlling system 111 determines a timing to start a color carriage pre-print operation, which follows the white printing operation with the white print head 23. In the present embodiment, the white print controlling system 111 determines a timing to start a color carriage pre-print operation, which is variable and can be set according to an attribute of the print data stored in the RAM 103. Specifically, it is set that the color carriage pre-print operation to start when an amount of remaining and unprinted print data in the print data in the RAM 103 decreases to a predetermined amount. The predetermined amount may be, for example, an amount corresponding to a number of lines for the first carriage 26 to scan in the main scanning direction. The first white print controlling system 111 sets the predetermined amount to be such that a period for the first print head 23 to process the predetermined amount of data is substantially equivalent to a predicted period, which is required for the color carriage pre-print operation with the second carriage 22 to complete. According to the time setting, the color carriage pre-print operation with the second carriage 22 is completed upon completion of the white carriage print operation with the first print head 23. Therefore, a colored printing operation can be started immediately after the white printing operation with the first print head 23. The predicted period required by the color carriage pre-print operation, as well as a white carriage pre-print operation, is substantially steady regardless of a volume of the print data and preliminarily stored in a data storage such as the RAM 103 or 203.

In S35, the first white print controlling system 111 examines as to whether status of the first carriage 26 is "ready" for the print data. If the first carriage 26 is not ready (S35: NO), the flow repeats S35 until the first carriage 26 becomes ready. When the first carriage 26 is ready (S35: YES), the flow proceeds to S100. In the present embodiment, status of the first and the second carriages 26, 22 includes "printing," in which image forming with the first or the second carriage 26, 22 is in progress. The status "printing" further includes the first or the second carriage 26, 22 in a pre-print operation and an after-print operation. When the first or the second carriage 26, 22 is not in "printing," the status of the first or the second carriage 26, 22 is referred to as "ready."

In S100, the first white print controlling system 111 conducts a white carriage pre-print operation, in which the suction cap 15 sealing the nozzle surface of the first print head 23 is detached therefrom, the ink adhered to the nozzle surface is wiped off, and the first carriage 26 is moved from the maintenance position to the print starting position.

The white carriage pre-print operation will be described with reference to FIG. 10. When the white carriage pre-print operation starts, in S110, the first white print controlling system 111 sets the status of the first carriage 26 to "printing" and transmits information concerning the status to the other white print controlling system, i.e., the second white print controlling system 112.

In S120, the first white print controlling system 111 transmits controlling singles to the wiper unit 30 to shift the suction cap 15 downward to uncap the nozzle surface of the first print head 23.

In S130, the first white print controlling system 111 wipes the nozzle surface of the first print head 23. Specifically, the first white print controlling system 111 transmits controlling signals to the wiper unit 30 to drive the motor and moves the wiper mount 38 along the guide 33 so that the nozzle surface of the first print head 23 is wiped by the wiper 37.

In S140, the first white print controlling system 111 transmits controlling signals to the first carriage motor drive circuit 122 in the first print control circuit 120 to drive the first carriage motor 25 so that the first carriage 26 is moved from the maintenance position corresponding to the maintenance station 40 to the print starting position. The white carriage pre-print operation is completed thereafter.

The flow returns to the first white print controlling operation shown in FIG. 9. In S200, the first white print controlling system 111 conducts a white carriage printing operation with the first print head 23 to the first recording medium. The white carriage printing operation will be described with reference to FIG. 11.

When the white carriage printing operation starts, in S210, the first white print controlling system 111 transmits controlling signals to the first platen motor drive circuit 123 in the first print control circuit 120 to drive the first platen drive motor 71 so that the first platen 5 starts moving toward the print starting position for white printing with the first platen 5.

In S215, the first white print controlling system 111 examines as to whether the first platen 5 has reached the print starting position for white printing based on signals transmitted from the first platen position sensor 291 and received through the first sensor I/O circuit 124 in the first print control circuit 120. The examination is repeated until the first platen 5 reaches the print starting position for white printing (S215: NO). When the first platen 5 reaches the print starting position (S215: YES), the flow proceeds to S220.

In S220, the first white print controlling system 111 transmits controlling signals to the first carriage motor drive circuit 122, the first print head drive circuit 121, and the first platen motor drive circuit 123 in the first print control circuit 120 so that the first carriage 26, the first print head 23, and the first platen 5 are manipulated in cooperation with one another to form a white image in the white ink ejected from the first print head 23 on the first recording medium. More specifically, the first carriage 26 is driven in the main scanning direction to eject the white ink for one line on the first recording medium to form a partial image. The first platen 5 is thereafter moved in the auxiliary direction for an amount corresponding to one line, and the first carriage 26 is again driven to form a next line of the image. Thus, the image is formed on the first recording medium in the white ink (i.e., white printing).

In S225, the first white print controlling system 111 examines as to whether the time has reached the timing to start the color carriage pre-print operation set in S30. That is, it is examined as to whether the amount of the remaining of the print data stored in the RAM 103 has decreased to the predetermined amount. The determination may be made, for example, based on judgment as to whether a number of remaining lines in the main scanning direction to be scanned by the first carriage 26 has decreased to a predetermined number. When the time has not reached, i.e., the amount of the remaining of the print data is larger than the predetermined amount (S225: NO), the flow repeats S225. When the time has reached the timing to start the color carriage pre-print operation, the flow proceeds to S230.

In S230, the first white print controlling system 111 transmits an instruction to start the color carriage pre-print operation to the first color print controlling system 113.

In S235, the first white print controlling system 111 examines as to whether white printing has been completed. When white printing is not completed (S235: NO), the first white print controlling system 111 repeats S235. When white printing is completed (S235: YES), the white printing operation is terminated.

The flow returns to the white print controlling operation shown in FIG. 9. In S300, the first white print controlling system 111 conducts a white carriage after-print operation, in which the first carriage 26 is moved to the print ending position to the maintenance position, the ink adhered to the nozzle surface of the first print head 23 is wiped off, and the suction cap 15 is attached to the nozzle surface. The white carriage after-print operation will be described with reference to FIG. 12.

When the white carriage after-print operation starts, in S310, the first white print controlling system 111 transmits controlling signals to the first carriage motor drive circuit 122 in the first print control circuit 120 to drive the first carriage motor 25 so that the first carriage 26 is moved from the print ending position to the maintenance position corresponding to the maintenance station 40.

In S320, the first white print controlling system 111 wipes the nozzle surface of the first print head 23. Specifically, the first white print controlling system 111 transmits controlling signals to the wiper unit 30 to drive the motor and moves the wiper mount 38 along the guide 33 so that the nozzle surface of the first print head 23 is wiped by the wiper 37.

In S330, the first white print controlling system 111 transmits controlling signals to the wiper unit 30 to uplift the suction cap 15 so that the suction cap 15 is attached to the nozzle surface of the first print head 23.

In S340, the first white print controlling system 111 sets the status of the first carriage 26 to “ready” and transmits information concerning the status to the second white print controlling system 112. The white carriage after-print operation is terminated thereafter.

The flow returns to the white print controlling operation shown in FIG. 9, and the white print controlling operation is terminated.

Next, with reference to FIGS. 13-16, controls of the colored printing operations in the inkjet printer 1 will be described.

When a color print controlling operation starts, in S1010, the first color print controlling system 113 examines as to whether the instruction to start the color carriage pre-print operation from the first white print controlling system 111 has been received. If the instruction has been received (S1010: YES), the flow proceeds to S1020.

In S1020, the first color print controlling system 113 examines as to whether the print data contained in the RAM 103 is data to form the image in the colored inks by driving the second print head 21. If the print data does not represent the image to be formed in the colored inks (S1020: NO), the color print controlling operation is terminated. If the print data representing the image to be formed in the colored inks is contained in the RAM 103 (S1020: YES), the flow proceeds to S1030.

In S1030, the first color print controlling system 113 examines as to whether status of the second carriage 22 is “ready” for the print data. If the second carriage 22 is not ready (S1030: NO), the flow repeats S1030 until the second carriage 22 becomes ready. When the second carriage 22 is ready (S1030: YES), the flow proceeds to S1100.

In S1100, the first color print controlling system 113 conducts a color carriage pre-print operation, in which the suction cap 15 sealing the nozzle surface of the second print head 21 is detached therefrom, the ink adhered to the nozzle surface is wiped off, and the second carriage 22 is moved from the maintenance position to the print starting position.

The color carriage pre-print operation will be described with reference to FIG. 14. When the color carriage pre-print operation starts, in S1110, the first color print controlling system 113 sets the status of the second carriage 22 to “printing” and transmits information concerning the status to the other color print controlling system, i.e., the second color print controlling system 114.

In S1120, the first color print controlling system 113 transmits controlling singles to the wiper unit 30 to shift the suction cap 15 downward to uncap the nozzle surface of the first print head 23.

In S1130, the first color print controlling system 113 wipes the nozzle surface of the second print head 21. Specifically, the first color print controlling system 113 transmits controlling signals to the wiper unit 30 to drive the motor and moves the wiper mount 38 along the guide 33 so that the nozzle surface of the second print head 21 is wiped by the wiper 37.

In S1140, the first color print controlling system 113 transmits controlling signals to the second carriage motor drive circuit 142 in the second print control circuit 140 to drive the second carriage motor 24 so that the second carriage 22 is moved from the maintenance position corresponding to the maintenance station 50 to the print starting position. The color carriage pre-print operation is completed thereafter.

The flow returns to the first color print controlling operation shown in FIG. 13. In S1200, the first color print controlling system 113 conducts a color carriage printing operation with the second print head 21 to the first recording medium. The color carriage printing operation will be described with reference to FIG. 15.

When the color carriage printing operation starts, in S1210, the first color print controlling system 113 transmits controlling signals to the first platen motor drive circuit 123 in the first print control circuit 120 to drive the first platen drive motor 71 so that the first platen 5 starts moving toward the print starting position for colored printing with the first platen 5.

In S1220, the first color print controlling system 113 examines as to whether the first platen 5 has reached the print starting position for colored printing based on signals transmitted from the first platen position sensor 291 and received through the first sensor I/O circuit 124 in the first print control circuit 120. The examination is repeated until the first platen 5 reaches the print starting position for colored printing (S1220: NO). When the first platen 5 reaches the print starting position (S1220: YES), the flow proceeds to S1230.

In S1230, the first color print controlling system 113 transmits controlling signals to the second carriage motor drive circuit 142, the second print head drive circuit 141, and the first platen motor drive circuit 123 in the first print control circuit 120 so that the second carriage 22, the second print head 21, and the first platen 5 are manipulated in cooperation with one another to form a colored image in the colored inks ejected from the second print head 21 on the first recording medium. More specifically, the second carriage 22 is driven in the main scanning direction to eject the colored inks for one line on the first recording medium to form a partial image. The first platen 5 is thereafter moved in the auxiliary direction for an amount corresponding to one line, and the second carriage 22 is again driven to form a next line of the image. Thus, the image is formed on the first recording medium in the colored inks (i.e., colored printing).

In S1240, the first color print controlling system 113 examines as to whether colored printing has been completed. When colored printing is not completed (S1240: NO), the first color print controlling system 113 repeats S1240. When colored printing is completed (S1240: YES), the flow proceeds to S1250.

In S1250, the first color print controlling system 113 transmits controlling signals to the first platen motor drive circuit 123 in the first print control circuit 120 to drive the first platen drive motor 71 so that the first platen 5 is moved to the removal position, shown in FIG. 1, in which the fabric can be removed from the first platen 5. The color print controlling operation is terminated thereafter.

The flow returns to the color print controlling operation shown in FIG. 13. In S1300, the first color print controlling system 113 conducts a color carriage after-print operation, in which the second carriage 22 is moved to the print ending position to the maintenance position, the ink adhered to the nozzle surface of the second print head 21 is wiped off, and the suction cap 15 is attached to the nozzle surface. The color carriage after-print operation will be described with reference to FIG. 16.

When the color carriage after-print operation starts, in S1310, the first color print controlling system 113 transmits controlling signals to the second carriage motor drive circuit 142 in the second print control circuit 140 to drive the second carriage motor 24 so that the second carriage 22 is moved from the print ending position to the maintenance position corresponding to the maintenance station 50.

In S1320, the first color print controlling system 113 wipes the nozzle surface of the second print head 21. Specifically, the first color print controlling system 113 transmits controlling signals to the wiper unit 30 to drive the motor and moves the wiper mount 38 along the guide 33 so that the nozzle surface of the second print head 21 is wiped by the wiper 37.

In S1330, the first color print controlling system 113 transmits controlling signals to the wiper unit 30 to uplift the suction cap 15 so that the suction cap 15 is attached to the nozzle surface of the second print head 21.

In S1340, the first color print controlling system 113 sets the status of the second carriage 22 to "ready" and transmits information concerning the status to the second color print controlling system 114. The color carriage after-print operation is terminated thereafter.

The flow returns to the color print controlling operation shown in FIG. 13, and the color print controlling operation is terminated.

Figure 17:
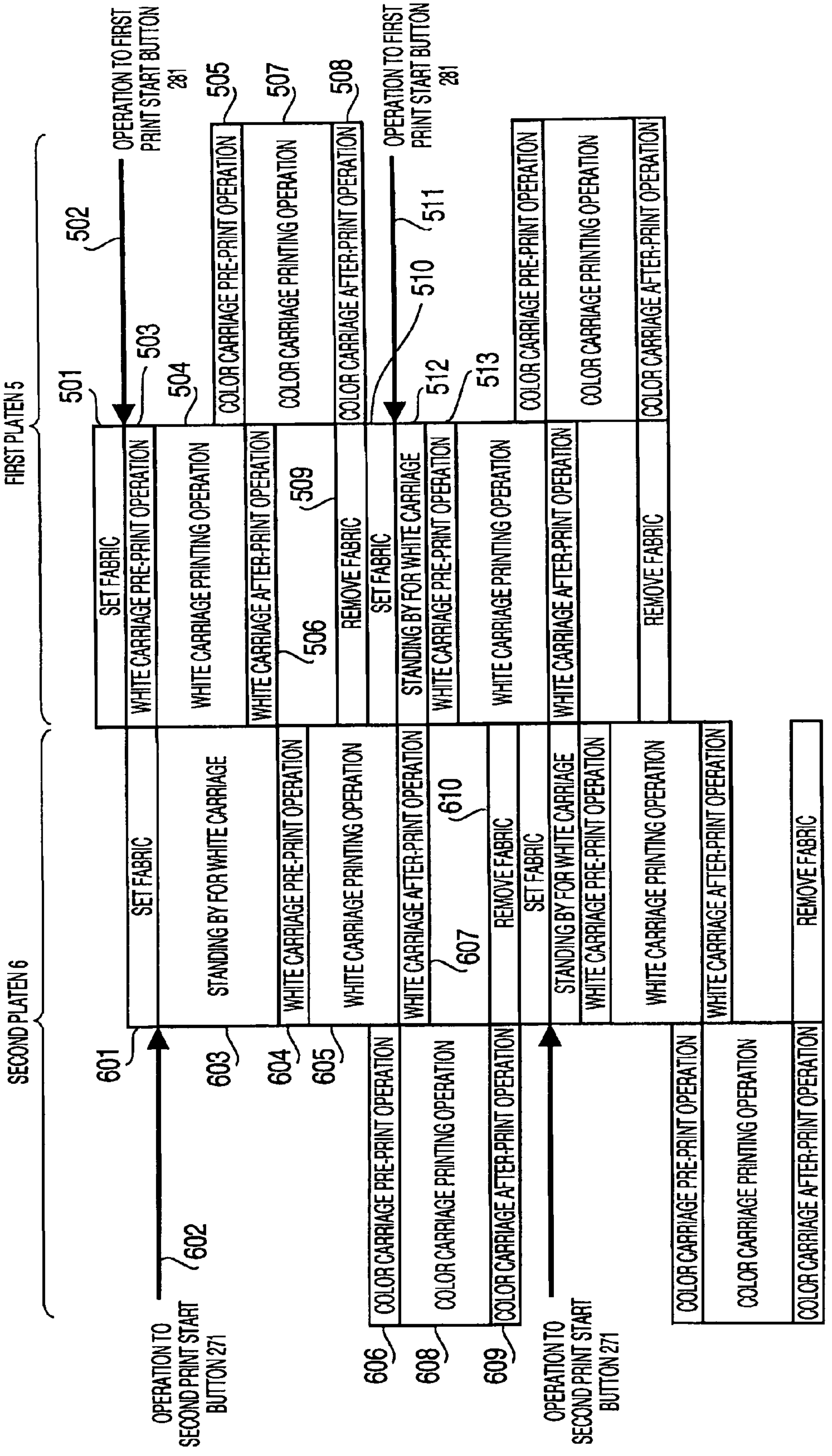
FIG. 17 is a time chart to illustrate behaviors of the inkjet printer according to the embodiment of the present invention.

Next, with reference to FIG. 17, behaviors of the inkjet printer 1 in the printing operation will be described. FIG. 17 is a time chart to illustrate behaviors of the inkjet printer 1 according to the embodiment of the present invention. FIG. 17 illustrate behaviors of the inkjet printer 1 when same print data is used to print a same image on each piece of fabric on the first and the second platens 5, 6. In FIG. 17, lead times required for white printing and colored printing, pre-print operations and after-print operations including movements of the carriages, wiping, and capping/uncapping of the suction cap 15, are illustrated to be substantially equivalent and not different between the white printing operation and the colored printing operation for explanation simplicity. Reference numerals in parentheses in the description below refer to each segmented time period in the printing operation.

As shown in FIG. 17, when the operator sets a first piece of a first recording medium on the first platen 5 (501) and operates the first print start button 281 in the first operation panel 28 (502), the first white print controlling system 111 conducts a white carriage pre-print operation (see S100 in FIG. 10) for the first recording medium, which includes uncapping the nozzle surface of the first print head 23, wiping the nozzle surface, and moving the first carriage 26 to the print starting position (503). In this regard, status of the first carriage 26 is updated to "printing" (see S110 in FIG. 10). After completion of the white carriage pre-print operation, the first white print controlling system 111 conducts a white carriage printing operation (504) (see S200 in FIG. 11). During the white carriage printing operation, when the running time reaches the predetermined timing, the first white print controlling system 111 transmits the instruction to start the color carriage pre-print operation to the first color print controlling system 113 (see S225 and S230 in FIG. 11). Upon receiving the instruction, the first color print controlling system 113 starts the color carriage pre-print operation with the second carriage 22 (505) (see S1100 in FIG. 14).

After completion of the white carriage printing operation, the first white print controlling system 111 conducts the white carriage after-print operation including moving the first carriage 26 to the maintenance position, wiping the nozzle surface of the first print head 23, and capping the nozzle surface (506) (see S300 in FIG. 12). In this regard, because the timing of the color carriage pre-print operation is set such that the color carriage pre-print operation with the second carriage 22 completes substantially simultaneously with completion of the white carriage printing operation with the first carriage 26, the white carriage printing operation as well as the color carriage pre-print operation completes. Therefore, upon completion of the white carriage printing operation with the first carriage 26, the first color print controlling system 113 can start the color carriage printing operation with the first recording medium immediately (507) (see S1200 in FIG. 15).

The first color print controlling system 113 drives the first platen 5 to the removal position (see S1250 in FIG. 15) and, upon completion of the color carriage printing operation, conducts a color carriage after-print operation with the second carriage 22 (508) (see S1300 in FIG. 16). The operator removes the first recording medium with the image formed thereon from the first platen 5 (509). Thus, the printing operation to the first piece of the first recording medium is completed.

After the operator operates the first print start button 281 and whilst one of the white carriage pre-print operation, the white carriage printing operation, and the white carriage after-print operation is in progress, the operator sets a first piece of a second recording medium on the second platen 6 (601). When the operator operates the second print start button 271 in the second operation panel 27 (602), the second white print controlling system 112 refers to status of the first carriage 26, which is "printing," and therefore stands by (603) (see S35 in FIG. 9).

When the white carriage after-print operation in the first white print controlling system 111 with the first carriage 26 (505) completes, status of the first carriage 26 is updated to "ready" (see S340 in FIG. 12). Accordingly, the second white print controlling system 112 activates the first carriage 26 and conducts a white carriage pre-print operation with the first carriage 26 (604) (see S35 and S100 in FIG. 9).

Succeeding operations are similar to the above described procedures 504-509 for the first platen 5. That is, the second white print controlling system 112 conducts a white carriage printing operation with the first carriage 26 (605) (see S20 in FIG. 11). During the white carriage printing operation, when the running time reaches the predetermined timing, the second white print controlling system 112 transmits the instruction to start the color carriage pre-print operation to the second color print controlling system 114 (see S225 and S230 in FIG. 11). Meanwhile, the status of the second carriage 22 is "ready," (the color carriage after-print operation with the first platen 5 (508) has been completed) and upon receiving the instruction, the second color print controlling system 114 starts the color carriage pre-print operation with the second carriage 22 (606) (see S1030 in FIG. 13 and S1100 in FIG. 14).

Upon completion of the white carriage printing operation, the second white print controlling system 112 conducts a white carriage after-print operation with the first carriage 26 (607) (see S300 in FIG. 12). When the white carriage printing operation (605) with the first print head 23 completes, the color carriage pre-print operation (606) with the second carriage 22 is completed at substantially the same time. Therefore, upon completion of the white carriage printing operation with the first carriage 26, the second color print controlling system 114 can start the color carriage printing operation with the second recording medium immediately (608) (see S1200 in FIG. 15).

The second white print controlling system 112 drives the second platen 6 to the removal position (see S1250 in FIG. 15), and, upon completion of the color carriage printing operation, conducts a color carriage after-print operation with the second carriage 22 (609) (see S1300 in FIG. 16). The operator removes the second recording medium with the image formed thereon from the second platen 6 (610). Thus, the printing operation to the first piece of the second recording medium is completed.

Next, the operator sets a second piece of the first recording medium on the first platen 5 (510) and operates the first print start button 281 in the first operation panel 28 (511). Meanwhile, the white carriage after-print operation (607) with the first carriage 26 and the second platen 6 is in progress; therefore, the status of the first carriage is "printing." Accordingly, the first white carriage print controlling system 111 stands by for the first carriage 26 (512) (see S35 in FIG. 9). Upon completion of the white carriage after-print operation (607) with the first carriage 26, the status of the first carriage is updated to "ready" (S340 in FIG. 12). Accordingly, the first white print controlling system 111 activates the first carriage 26 and conducts a white carriage pre-print operation with the first carriage 26 (513) (see S35 and S100 in FIG. 9).

In the inkjet printer 1 according to the above embodiment, the white carriage after-print operation with the first carriage 26 and the color carriage pre-print operation with the second carriage 22 are performed simultaneously in parallel with each other on either of the first platen 5 and the second platen 6. Therefore, the color carriage pre-print operation with the second carriage 22 does not wait for the white carriage after-print operation with the first carriage 26 to complete. Rather, a period for the white carriage after-print operation with the first carriage 26 is overlapped with a period for the color carriage pre-print operation with the second carriage 22. Therefore, non-printing period, in which no white printing operation or colored printing operation is performed, is effectively shortened, and productivity of the inkjet printer 1 per unit of time can be increased.

In the inkjet printer 1 according to the above embodiment, the timing to start the color carriage pre-print operation can be determined in the white print controlling operation, which is conducted by the first white print controlling system 111 and the second white print controlling system 112; therefore, the overlapping period for the white carriage after-print operation and the color carriage pre-print operation can be variably controlled.

Further, the timing to start the color carriage pre-print operation can be determined according to the amount of the print data to be used in white printing. Therefore, the timing to start the color carriage pre-print operation can be adjusted based on the length of the period required for the white carriage printing operation so that the overlapping period can be effectively reserved.

Furthermore, the timing to start the color carriage pre-print operation can be determined based on the amount of the remaining unprinted data for white printing becomes as small as a predetermined amount. Therefore, the color carriage pre-print operation can be activated when the amount of the remaining unprinted data as small as the predetermined amount so that the period for color carriage pre-print operation can be effectively overlapped with the remaining period for the white carriage print operation with the first print head 23.

In the above embodiment, each of the white carriage after-print operation and the color carriage after-print operation includes wiping (i.e., manipulating the wiper 37 to wipe the nozzle surface of the first or the second print head 23, 21) and capping (i.e., attaching the suction cap 15 to the nozzle surface of the first or second print head 23, 21). Therefore, the nozzle surfaces of the first and the second print heads 23, 21 wiped by the wiper 37 can be sealed with the suction cap 15 in the after-print operations to be maintained clean.

Further, in the above embodiment, each of the white carriage pre-print operation and the color carriage pre-print operation includes uncapping (i.e., detaching the suction cap 15 from the nozzle surface of the first or second print head 23, 21) and wiping (i.e., manipulating the wiper 37 to wipe the nozzle surface of the first or the second print head 23, 21). Therefore, the nozzle surface sealed by the suction cap 15 is released prior to wiping in pre-print operations when the suction cap 15 is detached from the nozzle surface.

Although an example of carrying out the invention has been described, those skilled in the art will appreciate that there are numerous variations and permutations of the printing apparatus that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

In the above embodiment, the timing to start the color carriage pre-print operation is set according to the amount of the print data; however, the timing may be determined in different methods. For example, a period required for white carriage printing operations in the past is timed so that the timing to start the color carriage pre-print operation can be variably set based on the length of the collected period. More specifically, a predicted period required for a color carriage pre-print operation is subtracted from a period required for the past white carriage printing operation, and the timing to start the color carriage pre-print operation can be set to have a length of the remaining of the subtracted period which starts from activation of the white carriage printing operation. Thus, the timing to start the color carriage pre-print operation can be set according to the period required for the white carriage printing operations based on experiences so that the length for the color carriage pre-print operation to overlap the white carriage printing operation can be reserved. Therefore, the color carriage printing operation can be activated immediately after completion of the white carriage printing operation based on the period required for the actual white carriage printing operation. Further, the periods required for past white carriage printing operations can be collected so that the timing to start the color carriage pre-print operation can be determined without considering the size of the print data.

In the above embodiment, the timing to start the color carriage pre-print operation is set based on an assumption that the predicted period for the color carriage pre-print operation is steady regardless of the platens (i.e., the first platen 5 or the second platen 6) being involved in the operation. However, the period required for the color carriage pre-print operation can be varied according to the platen being involved in the operation. That is, a period required for a color carriage pre-print operation with the first platen 5 and a period required for a color carriage pre-print operation with the second platen 6 can be different, because a distance for the second carriage 22 to travel, which is between the maintenance position corresponding to the maintenance station 50 and the starting position for color printing, varies depending on the platen to be operated with. Therefore, the timing to start the color carriage pre-print operation can be varied according to whether the platen to be operated with is the first platen 5 or the second platen 6. More specifically, the distance between the maintenance position for the second carriage 22 and the starting position for colored printing is greater when the color carriage pre-print operation with the first platen 5 to form the image on the first recording medium is performed than when the color carriage pre-print operation with the second platen 6 to form the image on the second recording medium is performed. Therefore, the predicted period for the color carriage pre-print operation with the first platen 5 can be considered to be greater than the predicted period for the color carriage pre-print operation with the second platen 6 before the timing to start the color carriage pre-print operation is determined. Thus, the timing to start the color carriage pre-print operation can be set according to the difference of the distances between the maintenance position for the second carriage 22 and the starting point of colored printing, which depends on the platens to be driven, and the overlapping period for the color carriage pre-print operation can be reserved.

In the above embodiment, the color carriage pre-print operation with the second carriage 22 terminates at the same time with completion of the white carriage printing operation with the first print head 23 so that the color printing operation with the second print head 21 can be started immediately after completion of the white printing operation with the first print head 23. However, when the colored inks are laid over the freshly ejected white ink, the colored inks may blur in the white ink, and the image may not be formed correctly. Therefore, a period to standby between completion of the white carriage printing operation with the first print head 23 and activation of the color carriage pre-print operation can be set to be substantially longer than a predetermined length of a threshold period. When the standby period is shorter than the threshold period, the timing to start the color carriage pre-print operation with the second print head 21 can be delayed so that the color carriage printing operation can be started at least after the predetermined threshold period. Thus, deficiencies which can be caused in the freshly overlaid inks such as blur can be prevented.

In the above embodiment, purging operations of the first and the second print heads 23, 21 are not considered; however, periods required for the purging operations can be included when the timing to start the color carriage pre-print operation is determined. The first color print controlling system 113 conducts a purging operation within a color carriage pre-print operation when a predetermined number of color printing operations are performed after the last purging operation with the second carriage 22 or when a predetermined period has elapsed after the last purging operation and no color printing operations has been performed. Therefore, when the purging operation is included in the color carriage pre-print operation, a period predicted for the purging operation is included in the consideration to determine the timing to start the color carriage pre-print operation.

For another example, furthermore, the period for the color carriage pre-print operation with the second carriage 22 may not necessarily be overlapped with the period for the white carriage printing operation with the first print head 23. The timing to start the color carriage pre-print operation can be set to overlap at least partially with the white carriage after-print operation with the first carriage 26 as long as the non-printing period for either of the first carriage 26 or the second carriage 22 is effectively decreased.

In the above embodiment, the inkjet printer 1 conducts white printing with the first print head 23 and colored-printing with the second print head 21 thereafter so that, for example, a base layer in white ink is formed on a dark-colored recording medium and a colored layer in colored inks is formed on the base layer to obtain a clearer image on the recording medium. However, the present invention can be applied to an inkjet printer when, for example, the inkjet printer conducts colored printing with the second print head 21 and white printing with the first print head 23 thereafter so that, for example, a base layer in colored inks is formed on a light-colored recording medium and a white layer in a white ink is formed on the base layer to obtain a clearer image on the recording medium. Moreover, the present invention can be applied to an inkjet printer when, for example, the inkjet printer conducts white printing over white printing with the first print head 23 or colored-printing over colored-printing with the second print head 21 on a recording medium.

In the above embodiment, arrows shown in the accompanying drawings, specifically in FIGS. 7 and 8, illustrate flows of signals to be exchanged between the components, and may not necessarily limit directions of the signals to be transmitted. Further, the steps in the flowcharts shown in FIGS. 9-15 may be omitted, added and/or replaced with another steps if necessary as long as the modification does not exceed the spirit and scope of the invention.

What is claimed is:

1. A printing apparatus capable of forming images successively on a plurality of pieces of recording media, comprising:

at least two medium holders including a first medium holder to hold a first recording medium and a second medium holder to hold a second recording medium;

at least two print heads including a first print head, which is driven according to first print data to eject ink onto the first recording medium and the second recording medium, and a second print head, which is driven according to second print data to eject ink onto the first recording medium and the second recording medium;

at least two print head drive units including a first print head drive unit, which drives the first print head in a main scanning direction, and a second print head drive unit, which drives the second print head in the main scanning direction;

at least two holder drive units including a first holder drive unit to drive the first medium holder in an auxiliary direction, which is perpendicular to the main scanning direction, and a second holder drive unit to drive the second medium holder in the auxiliary direction;

at least two ink cartridges including a first ink cartridge, which stores ink therein and supplies the ink to the first print head, and a second ink cartridge, which stores ink therein and supplies the ink to the second print head; and a cooperation controlling system to control printing operations in the printing apparatus, wherein the printing operations include:

a first printing operation to print an image on one of the first recording medium and the second recording medium in cooperation with the first print head, the first print head drive unit, and one of the first holder drive unit and the second holder drive unit;

a first pre-print operation including a moving behavior, by which the first print head is moved from a first maintenance position to a first starting position;

a first after-print operation including a moving behavior, by which the first print head is moved from a first ending position to the first maintenance position;

a second printing operation to print an image on one of the first recording medium and the second recording medium in cooperation with the second print head, the second print head drive unit, and one of the first holder drive unit and the second holder drive unit;

a second pre-print operation including a moving behavior, by which the second print head is moved from a second maintenance position to a second starting position; and a second after-print operation including a moving behavior, by which the second print head is moved from a second ending position to the second maintenance position; and wherein the cooperation controlling system controls at least one of:

the second print head and the second print head drive unit so that the second pre-print operation is conducted at least partially simultaneously with the first after-print operation when the first printing operation and the second printing operation are conducted successively to one of the first recording medium and the second recording medium; and the first print head and the first print head drive unit so that the first pre-print operation is conducted at least partially simultaneously with the second after-print operation when the first printing operation and the second printing operation are conducted successively to one of the first recording medium and the second recording medium.

2. The printing apparatus according to claim 1, further comprising:

a timer to set a timing to start at least one of the second pre-print operation and the first pre-print operation, wherein the cooperation controlling system controls one of:

at least the second print head and the second print head drive unit according to the timing set by the timer; and at least the first print head and the first print head drive unit according to the timing set by the timer.

3. The printing apparatus according to claim 2, wherein the timer sets at least one of:

the timing to start the second pre-print operation according to an attribute of the first print data; and the timing to start the first pre-print operation according to an attribute of the second print data.

4. The printing apparatus according to claim 3, wherein the timer sets at least one of:

the timing to start the second pre-print operation so that the second pre-print operation is started when an amount of remaining unprinted print data of the first print data becomes equivalent to a predetermined amount; and the timing to start the first pre-print operation so that the first pre-print operation is started when an amount of remaining unprinted print data of the second print data becomes equivalent to a predetermined amount.

5. The printing apparatus according to claim 2, wherein the timer sets at least one of:

the timing to start the second pre-print operation according to a first operation period, which was required to perform a first printing operation in earlier times; and the timing to start the first pre-print operation according to a second operation period, which was required to perform the second printing operation in earlier times.

6. The printing apparatus according to claim 5, wherein the timer sets at least one of:

the timing to start the second pre-print operation according to the first operation period and a first predicted period, which is predictably required for the second pre-print operation, so that the second pre-print operation starts after activation of the first printing operation and after a length of period, which is obtained by subtracting the first predicted period from the first operation period; and the timing to start the first pre-print operation according to the second operation period and a second predicted period, which is predictably required for the second pre-print operation, so that the first pre-print operation starts after activation of the second printing operation and after a length of period, which is obtained by subtracting the second predicted period from the second operation period.

7. The printing apparatus according to claim 2, wherein the timer sets at least one of:

the timing to start the second pre-print operation according to a distance for the second print head to travel in the moving behavior in the second pre-print operation between the second maintenance position and the second starting position; and the timing to start the first pre-print operation according to a distance for the first print head to travel in the moving behavior in the first pre-print operation between the first maintenance position and the first starting position.

8. The printing apparatus according to claim 1, wherein the first after-print operation further includes a first after-print wiping behavior to wipe off ink adhered to a nozzle surface of the first print head after the moving behavior and a first capping behavior to attach a cap onto the nozzle surface of the first print head after the first after-print wiping behavior; and wherein the second after-print operation further includes a second after-print wiping behavior to wipe off ink adhered to a nozzle surface of the second print head after the moving behavior and a second capping behavior to attach a cap onto the nozzle surface of the second print head after the second after-print wiping behavior.

9. The printing apparatus according to claim 1, wherein the first pre-print operation further includes a first uncapping behavior to detach a cap from a nozzle surface of the first print head, a first pre-print wiping behavior to wipe off ink adhered to the nozzle surface of the first print head after the first uncapping behavior, and the moving behavior, by which the first print head is moved from the first ending position to the first maintenance position after the first uncapping behavior; and wherein the second pre-print operation further includes a second uncapping behavior to detach a cap from a nozzle surface of the second print head, a second pre-print wiping behavior to wipe off ink adhered to the nozzle surface of the second print head after the second uncapping behavior, and the moving behavior, by which the second print head is moved from the second ending position to the second maintenance position after the second uncapping behavior.

10. The printing apparatus according to claim 1, further comprising:

a judging unit to judge at least one of:

as to whether a standby period between completion of the first printing operation and activation of the second pre-print operation has reached a predetermined length; and as to whether a standby period between completion of the second printing operation and activation of the first pre-print operation has reached a predetermined length;

wherein the cooperation controlling system controls the at least one of:

the second print head and the second print head drive unit so that the second pre-print operation is started when the judging unit judges that the standby period between completion of the first printing operation and activation of the second pre-print operation has reached the predetermined length; and the first print head and the first print head drive unit so that the first pre-print operation is started when the judging unit judges that the standby period between completion of the second printing operation and activation of the first pre-print operation has reached the predetermined length.

* * * * *